US009310792B2

(12) United States Patent
Lu et al.

(10) Patent No.: US 9,310,792 B2
(45) Date of Patent: Apr. 12, 2016

(54) SCHEDULING AND MODELING THE OPERATION OF CONTROLLABLE AND NON-CONTROLLABLE ELECTRONIC DEVICES

(75) Inventors: Ning Lu, Richland, WA (US); Pengwei Du, Richland, WA (US); Xinxin Guo, Richland, WA (US); Robert G. Pratt, Kennewick, WA (US); Donald J. Hammerstrom, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 325 days.

(21) Appl. No.: 12/772,954

(22) Filed: May 3, 2010

(65) Prior Publication Data
US 2011/0270452 A1    Nov. 3, 2011

(51) Int. Cl.
*G06F 1/28*    (2006.01)
*G06F 1/26*    (2006.01)
(Continued)

(52) U.S. Cl.
CPC .............. *G05B 19/042* (2013.01); *G06F 1/266* (2013.01); *G06Q 10/04* (2013.01); *G06Q 10/06* (2013.01); *G06Q 10/067* (2013.01); *G05B 2219/2639* (2013.01); *Y02B 70/3241* (2013.01); *Y04S 10/54* (2013.01); *Y04S 20/227* (2013.01)

(58) Field of Classification Search
CPC ..... G06Q 10/06; G06Q 10/067; G06Q 10/04; G05B 19/042; G05B 2219/2639; G06F 1/266; Y04S 10/54; Y04S 20/227; Y02B 70/3241
USPC ......... 700/15, 16, 17, 28, 29, 32, 33, 36, 100, 700/275, 276, 291, 295, 296; 705/347, 400, 705/412; 340/3.1
See application file for complete search history.

(56) References Cited

U.S. PATENT DOCUMENTS 5,572,438 A    11/1996    Ehlers et al.
5,684,710 A    11/1997    Ehlers et al.
(Continued)

FOREIGN PATENT DOCUMENTS

WO    WO 02/23693    3/2002
WO    WO 2007/065135    6/2007
WO    WO 2011/139949    11/2011

OTHER PUBLICATIONS

Boyd et al., "Load Reduction, Demand Response, and Energy Efficient Technologies and Strategies," Pacific Northwest National Laboratory PNNL-18111, 44 pp. (Nov. 2008).
(Continued)

*Primary Examiner* — Charles Kasenge
(74) *Attorney, Agent, or Firm* — Klarquist Sparkman, LLP

(57) ABSTRACT

Disclosed herein are representative embodiments of methods, apparatus, and systems for controlling and scheduling power distribution in a power network, such as household power network. One disclosed embodiment is a system comprising a central controller and a control device coupled to a household appliance. The central controller can comprise computing hardware coupled to a wireless transceiver. The central controller can be configured to generate and transmit control signals for controlling the operational state of the household appliance according to the schedule. Furthermore, the control device can be configured to receive the transmitted control signals from the central controller and to control the operational state of the household appliance in response to the control signals.

60 Claims, 16 Drawing Sheets

(51) Int. Cl.
*G06Q 50/00* (2012.01)
*G05B 23/02* (2006.01)
*G06Q 10/00* (2012.01)
*G05B 19/042* (2006.01)
*G06Q 10/04* (2012.01)
*G06Q 10/06* (2012.01)

(56) References Cited

U.S. PATENT DOCUMENTS

| | | | |
|---|---|---|---|
| 5,696,695 A | 12/1997 | Ehlers et al. | |
| 5,924,486 A | 7/1999 | Ehlers et al. | |
| 6,145,328 A * | 11/2000 | Choi | 236/94 |
| 6,216,956 B1 | 4/2001 | Ehlers et al. | |
| 6,786,421 B2 * | 9/2004 | Rosen | 236/94 |
| 6,860,431 B2 | 3/2005 | Jayadev | |
| 7,049,976 B2 * | 5/2006 | Hunt et al. | 702/61 |
| 7,069,161 B2 * | 6/2006 | Gristina et al. | 705/412 |
| 7,089,190 B2 | 8/2006 | Tsui | |
| 7,130,719 B2 | 10/2006 | Ehlers et al. | |
| 7,216,021 B2 * | 5/2007 | Matsubara et al. | 700/295 |
| 7,343,226 B2 | 3/2008 | Ehlers et al. | |
| 7,343,360 B1 | 3/2008 | Ristanovic et al. | |
| 7,379,791 B2 * | 5/2008 | Tamarkin et al. | 700/286 |
| 7,379,997 B2 | 5/2008 | Ehlers et al. | |
| 7,418,428 B2 | 8/2008 | Ehlers et al. | |
| 7,516,106 B2 | 4/2009 | Ehlers et al. | |
| 7,606,683 B2 * | 10/2009 | Bahel et al. | 700/276 |
| 7,783,390 B2 * | 8/2010 | Miller | 700/291 |
| 8,090,476 B2 * | 1/2012 | Dawson et al. | 700/276 |
| 8,185,245 B2 * | 5/2012 | Amundson et al. | 700/277 |
| 8,285,419 B2 * | 10/2012 | Drew | 700/276 |
| 8,326,466 B2 * | 12/2012 | Peterson | 700/276 |
| 8,538,586 B2 * | 9/2013 | Amundson et al. | 700/276 |
| 2002/0038279 A1 | 3/2002 | Samuelson et al. | |
| 2004/0010478 A1 | 1/2004 | Peljto et al. | |
| 2004/0074978 A1* | 4/2004 | Rosen | 236/1 C |
| 2004/0220702 A1* | 11/2004 | Matsubara et al. | 700/291 |
| 2006/0206240 A1 | 9/2006 | Tsui | |
| 2006/0247826 A1* | 11/2006 | Green et al. | 700/276 |
| 2008/0039980 A1 | 2/2008 | Pollack et al. | |
| 2008/0046387 A1 | 2/2008 | Gopal et al. | |
| 2008/0165714 A1 | 7/2008 | Dettinger et al. | |
| 2010/0101254 A1* | 4/2010 | Besore et al. | 62/264 |
| 2010/0106332 A1 | 4/2010 | Chassin et al. | |
| 2010/0106641 A1 | 4/2010 | Chassin et al. | |
| 2010/0107173 A1 | 4/2010 | Chassin | |
| 2010/0114387 A1 | 5/2010 | Chassin | |
| 2010/0179862 A1* | 7/2010 | Chassin et al. | 705/412 |
| 2011/0040417 A1* | 2/2011 | Wolfe et al. | 700/291 |
| 2011/0106316 A1* | 5/2011 | Drew et al. | 700/278 |
| 2011/0153101 A1* | 6/2011 | Thomas et al. | 700/291 |
| 2011/0184562 A1* | 7/2011 | Amundson et al. | 700/276 |
| 2011/0264290 A1* | 10/2011 | Drew | 700/291 |

OTHER PUBLICATIONS

Brambley, "Thinking Ahead: Autonomic Buildings," *ACEEE Summer Study on the Energy Efficiency in Buildings*, vol. 7, pp. 73-86 (2002).
Chassin et al., "Decentralized Coordination through Digital Technology, Dynamic Pricing, and Customer-Driven Control: The GridWise Testbed Demonstration Project," *The Electricity Journal*, vol. 21, pp. 51-59 (Oct. 2008).
Chassin et al., "Gauss-Seidel Accelerated: Implementing Flow Solvers on Field Programmable Gate Arrays," *IEEE Power Engineering Society General Meeting*, 5 pp. (Jun. 2006).
Chassin et al., "GridLAB-D: An open-source power systems modeling and simulation environment," *IEEE*, 5 pp. (Apr. 2008).
Chassin, "GridLAB-D Technical Support Document: Tape Modules Version 1.0," Pacific Northwest National Laboratory PNNL-17614, 8 pp. (May 2008).
Chassin, "GridLAB-D Technical Support Document: Commercial Modules Version 1.0," Pacific Northwest National Laboratory PNNL-17615, 8 pp. (May 2008).

Chassin, "GridLAB-D Technical Support Document: Network Module Version 1.0," Pacific Northwest National Laboratory PNNL-17616, 10 pp. (May 2008).
Chassin et al., "Modeling Power Systems as Complex Adaptive Systems," Pacific Northwest National Laboratory PNNL-14987, 151 pp. (Dec. 2004).
Chassin et al., "Project 2.6—Enhancement of the Whole-Building Diagnostician," Pacific Northwest National Laboratory PNNL-14383, 17 pp. (Aug. 2003).
Chassin, "The Abstract Machine Model for Transaction-based System Control," Pacific Northwest National Laboratory PNNL-14082, 28 pp. (Nov. 2002).
Chassin et al., "The pacific northwest demand response market demonstration," *IEEE*, 6 pp. (Jul. 2008).
Clearwater et al., "Thermal Markets for Controlling Building Environments," *Energy Engineering*, vol. 91, No. 3, pp. 26-56 (1994).
Fernandez et al., "Self Correcting HVAC Controls: Algorithms for Sensors and Dampers in Air-Handling Units," Pacific Northwest Laboratory PNNL-19104, 49 pp. (Dec. 2009).
Galbraith, "G.E. Markets First 'Smart Appliance'," *The New York Times—A Blog About Energy and the Environment*, 1 p. (Nov. 11, 2009).
Guttromson et al., "Residential energy resource models for distribution feeder simulation," *IEEE*, vol. 1, pp. 108-113 (Jul. 2003).
Hammerstrom et al., "Pacific Northwest GridWise Testbed Demonstration Projects: Part I. Olympic Peninsula Project," Pacific Northwest National Laboratory PNNL-17167, 157 pp. (Oct. 2007).
Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).
Hammerstrom et al., "Standardization of a Hierarchical Transactive Control System," *Grid Interop Conf.*, 7 pp. (Nov. 2009).
Hatley et al., "Energy Management and Control System: Desired Capabilities and Functionality," Pacific Northwest National Laboratory PNNL-15074, 46 pp. (Apr. 2005).
Huang et al., "Transforming Power Grid Operations," *Scientific Computing*, vol. 45, No. 5, pp. 22-27 (Apr. 2007).
International Search Report dated Feb. 8, 2012, from International Patent Application No. PCT/US2011/034752 (also published as WO 2011/139949, 3 pp.
Kannberg et al., "GridWise: The Benefits of a Transformed Energy System," Pacific Northwest National Laboratory PNNL-14396, 48 pp. (Sep. 2003).
Katipamula et al., "Evaluation of Residential HVAC Control Strategies for Demand Response Programs," *ASHRAE Trans., Symp. on Demand Response Strategies for Building Systems*, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).
Kintner-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).
Kok et al., "Agent-based Electricity Balancing with Distributed Energy Resources, a Multiperspective Case Study," *Proc. Hawaii Int'l Conf. on System Sciences*, 10 pp. (Jan. 2008).
Kok et al., "PowerMatcher: Multiagent Control in the Electricity Infrastructure," *AAMAS*, 8 pp. (Jul. 2005).
Lu et al., "A State-Queueing Model of Thermostatically Controlled Appliances," *IEEE Trans. on Power Systems*, vol. 19, No. 3, pp. 1666-1673 (Aug. 2004).
Lu et al., "Control Strategies of Thermostatically Controlled Appliances in a Competitive Electricity Market," *IEEE Proc. Power Engineering Society General Meeting*, pp. 202-207 (Jun. 2005).
Lu et al., "Grid Friendly Device Model Development and Simulation," Pacific Northwest National Laboratory PNNL-18998, 52 pp. (Nov. 2009).
Lu et al., "Modeling Uncertainties in Aggregated Thermostatically Controlled Loads Using a State Queueing Model," *IEEE Trans. on Power Systems*, vol. 20, No. 2, pp. 725-733 (May 2005).

(56) References Cited

OTHER PUBLICATIONS

Lu et al., "Pumped-Storage Hydro-Turbine Bidding Strategies in a Competitive Electricity Market," *IEEE Trans. on Power Systems*, vol. 19, No. 2, pp. 834-841 (May 2004).

Lu et al., "Simulating Price Responsive Distributed Resources," *IEEE*, vol. 3, pp. 1538-1543 (Oct. 2004).

Taylor et al., "GridLAB-D Technical Support Document: Residential End-Use Module Version 1.0," Pacific Northwest National Laboratory PNNL-17694, 30 pp. (Jul. 2008).

Written Opinion dated Feb. 8, 2012, from International Patent Application No. PCT/US2011/034752 (also published as WO 2011/139949), 4 pp.

* cited by examiner

700 ─►

710  712  714  716  718  720  722

Household Appliances Setting

750 — Thermostatically-Controlled

| Thermostatically-controlled appliances | | 1: On 0: Standby -1: Off | Price ($/MW) | | | Thermostat Setting | | | Period A | | Period B | | Period C | |
|---|---|---|---|---|---|---|---|---|---|---|---|---|---|---|
| | P(rated) | Controlable(1/0) | Status | H | M | L | H | L | POP | Start | End | Start | End | Start | End |
| Air Conditioner | 3.20 | 1 | 1 | 100 | 80 | 50 | 85 | 70 | 70 | 6 | 8 | 0 | 0 | 17 | 23 |
| Space Heating | 4.50 | 1 | 1 | 100 | 80 | 50 | 75 | 60 | 70 | 6 | 8 | 0 | 0 | 17 | 23 |
| Water Heater | 4.50 | 1 | 1 | 100 | 80 | 50 | 150 | 120 | 140 | 6 | 8 | 0 | 0 | 17 | 23 |
| Refrigerator | 0.50 | 1 | 1 | 100 | 80 | 50 | 40 | 32 | 34 | 0 | 24 | 0 | 0 | 0 | 0 |

752 — Non Thermostatically-Controlled

| Non Thermostatically-controlled appliances | | 1: On 0: Standby -1: Off | Price ($/MW) | | | Control Modes | | | Period A | | Period B | | Period C | |
|---|---|---|---|---|---|---|---|---|---|---|---|---|---|---|
| | P(rated) | Controlable(1/0) | Status | H | M | L | H | L | POP | Start | End | Start | End | Start | End |
| Dish Washer | 1.00 | 1 | 1 | 100 | 80 | 50 | 2 | 1 | 1 | 20 | 24 | 0 | 0 | 0 | 0 |
| Dryer | 4.50 | 1 | 1 | 100 | 80 | 50 | 2 | 1 | 1 | 20 | 24 | 0 | 0 | 0 | 0 |
| Clothwasher | 2.00 | 1 | 1 | 100 | 80 | 50 | 0 | 0 | 0 | 20 | 24 | 0 | 0 | 0 | 0 |

754 — Non-Controllable

| Non-controllable appliances | | 1: On 0: Standby -1: Off | Price ($/MW) | | | Control Modes | Period A | Period B | Period C |
|---|---|---|---|---|---|---|---|---|---|
| | P(rated) | Controlable(1/0) | Status | H | M | L | | | |
| Range | 4.50 | 0 | 1 | 100 | 80 | 50 | | | |
| Ventilation | 0.10 | 0 | 1 | 100 | 80 | 50 | | | |
| Microwave | 1.20 | 0 | 1 | 100 | 80 | 50 | | | |
| TV1 | 0.40 | 0 | 1 | 100 | 80 | 50 | | | |
| TV2 | 0.40 | 0 | 1 | 100 | 80 | 50 | | | |
| Lighting 1 | 0.36 | 0 | 1 | 100 | 80 | 50 | | | |
| Lighting 2 | 0.36 | 0 | 1 | 100 | 80 | 50 | | | |
| Lighting 3 | 0.36 | 0 | 1 | 100 | 80 | 50 | | | |
| Lighting 4 | 0.36 | 0 | 1 | 100 | 80 | 50 | | | |
| Lighting 5 | 0.36 | 0 | 1 | 100 | 80 | 50 | | | |
| Lighting 6 | 0.36 | 0 | 1 | 100 | 80 | 50 | | | |
| Lighting 7 | 0.36 | 0 | 1 | 100 | 80 | 50 | | | |

SAVE

SCHEDULING AND MODELING THE OPERATION OF CONTROLLABLE AND NON-CONTROLLABLE ELECTRONIC DEVICES

FIELD

This application relates generally to the field of home energy management.

BACKGROUND

The demand for electricity is expected to continue its historical growth trend far into the future. To meet this growth with traditional approaches would require adding power generation, transmission, and distribution that may cost in the aggregate up to $2,000/kW on the utility side of the meter. The amount of capacity in generation, transmission, and distribution generally must meet peak demand and must provide a reserve margin to protect against outages and other contingencies. Traditional approaches for maintaining the adequacy of the nation's power generation and delivery system are characterized by sizing system components to meet peak demand, which occurs only a few hours during the year. Thus, overall asset utilization remains low, particularly for assets located near the end-user in the distribution portion of the system.

The increased availability of energy-information technologies can play an important role in addressing the asset utilization issue in a cost-effective manner. It has been estimated that $57 billion savings could be realized by applying smart technologies throughout the nation's electric generation, transmission, and distribution systems over the next 20 years.

Accordingly, there is a need for improved home energy management systems and techniques that allow larger portions of the demand-side infrastructure to function as an integrated system element. For example, there is a need for systems and methods that enable end-use electrical devices and/or consumers to actively participate in grid control.

SUMMARY

Disclosed below are representative embodiments of methods, apparatus, and systems for managing electrical power usage in a house or other environment in which multiple electrical loads are present.

In one exemplary embodiment disclosed herein, a method is disclosed that comprises determining estimated market prices of power for an upcoming period of time; determining estimated operating times for a controllable electronic device during the upcoming period of time; and, using computing hardware, generating a schedule for operating the controllable electronic device during the upcoming period of time based at least in part on the estimated market prices of power for the upcoming period of time and the estimated operating times for the controllable electronic device. In certain implementations, the method further comprises generating control signals for operating the controllable electronic device according to the schedule. The control signals can then be transmitted to the controllable electronic device. In some implementations, the act of determining the estimated operating times for the controllable electronic device comprises receiving data from a user indicating desired operational times for the controllable electronic device during the upcoming period of time. In certain implementations, the method further comprises receiving data from a user indicating desired performance values for the controllable electronic device during the upcoming period of time. The performance values can be for a thermostatically-controlled device and include one or more of a low temperature limit, a high temperature limit, or a preferred temperature. Further, the act of generating the schedule can comprise generating a candidate schedule for the controllable electronic device that schedules operation of the controllable electronic device during intervals of the upcoming period of time in which the estimated market price is lower than in other intervals of the upcoming period of time; modeling performance of the controllable electronic device according to the generated schedule; and evaluating the modeled performance of the controllable electronic device to determine whether the modeled performance violates any of the performance values during the estimated operating times. Additionally, the act of generating the schedule further comprises revising the candidate schedule based on the evaluation. In certain implementations, the upcoming period of time is an upcoming day. In some implementations, the controllable electronic device is a thermostatically controlled electronic device or a non-thermostatically controlled electronic device. In some implementations, the act of generating the schedule comprises computing a value indicative of the cost of the operating the controllable electronic device according to the schedule and a value indicative of a user comfort level obtained when the controllable electronic device is operated according to the schedule. In certain implementations, the method further comprises determining estimated operating times for a non-controllable electronic device based on data indicating a historical usage of the non-controllable electronic device; and, using the computing hardware, generating a schedule for operating the non-controllable electronic device during the upcoming period of time based at least in part on the estimated operating times for the non-controllable electronic device. These implementations can further include monitoring power usage in a household power network; and computing the data indicating the historical usage of the non-controllable electronic device from the monitored power usage.

Another exemplary method disclosed herein comprises determining estimated operating times for a non-controllable electronic device based on data indicating a historical usage of the non-controllable electronic device; and using the computing hardware, generating a schedule for operating the non-controllable electronic device during the upcoming period of time based at least in part on the estimated operating times for the non-controllable electronic device. In certain implementations, the method further comprises monitoring power usage in a household power network; and computing the data indicating the historical usage of the non-controllable electronic device from the monitored power usage.

A further exemplary method disclosed herein comprises generating a schedule indicating time intervals during which a household device is operational and time intervals during which the household device is not operational, the time intervals being part of a greater time period; and, using computing hardware, computing a cost for operating the household device according to the schedule; and, using the computing hardware, computing a comfort level of a user when the household device is operated according to the schedule. In certain implementations, the schedule is a first schedule, and the method further comprises generating a second schedule indicating time intervals during which the household device is operational and time intervals during which the household device is not operational, at least one of the time intervals during which the household device is operational in the second schedule being different from the first schedule; using the computing hardware, computing a cost for operating the household device according to the second schedule; and using the computing hardware, computing a comfort level of a user when the household device is operated according to the second schedule. In some implementations, the generating the second schedule comprises modeling performance of the household device when the household device is operated according to the first schedule; evaluating the performance of the household device according to the first schedule relative to desired one or more operating times and one or more desired performance limits of the household device; and modifying the first schedule to address violations in the desired operating times and the desired performance limits of the household devices detected as a result of the evaluation. In certain implementations, the generating the schedule is based at least in part on preferences of a user input via a graphic user interface. The preferences of the user can identify one or more of the time intervals during which the user prefers to have the electronic device operational, one or more performance limits within which the user prefers to have the electronic device operate, or a price limit below which the user prefers to have the electronic device operate.

Another exemplary embodiment disclosed herein comprises one or more non-transitory computer-readable media storing computer-executable instructions for causing a computer to perform a method. In this embodiment, the method comprises providing a graphic user interface that displays a list of one or more controllable electronic devices to a user, the controllable electronic devices in the list being powered by a power network; and, via the graphic user interface, allowing a user to input data concerning operational parameters for the one or more controllable electronic devices. The operational parameters can include one or more time periods during which a selected one of the one or more controllable devices is to be activated. The operational parameters can further include a price limit for the selected one of the one or more controllable devices indicating a price at which the selected one of the one or more controllable devices is to be deactivated if exceeded by a current market price for power. In certain implementations, the operational parameters can further include one or more performance parameters indicating performance levels at which the selected one of the one or more controllable electronic devices is to be operated during the one or more time periods. In some implementations, the selected one of the one or more controllable electronic devices is a thermostatically controlled appliance, and the one or more performance parameters comprise one or more of a lower temperature limit, a higher temperature limit, or a preferred temperature. In certain implementations, the selected one of the one or more controllable electronic devices is a non-thermostatically controlled appliance, and the one or more performance parameters comprise one or more of a maximum performance level, a minimum performance level, or a preferred performance level.

In some implementations, the method further comprises, via the graphic user interface, allowing the user to input data concerning operational parameters for one or more non-controllable electronic devices. In certain implementations, the method further comprises generating a schedule for operating the one or more controllable electronic devices during the one or more time periods based at least in part on the data concerning the operational parameters. In some implementations, the generating the schedule is additionally based on estimated market prices of power for the one or more time periods. In certain implementations, the method further comprises generating control signals for operating the one or more controllable electronic devices according to the schedule. In some implementations, the method further comprises generating a schedule for one or more noncontrollable electronic devices based on historical usage patterns of the noncontrollable electronic devices. In certain implementations, the method further comprises, via the graphic user interface, allowing the user to input data concerning operational parameters for one or more noncontrollable electronic devices. The data concerning the operational parameters for the one or more noncontrollable electronic devices can include a power rating for each of the noncontrollable electronic devices.

Another embodiment disclosed herein is a system that comprises a central controller (the central controller comprising computing hardware coupled to a wireless transceiver) and a control device coupled to a household appliance. In this embodiment, the central controller is configured to generate and transmit control signals for controlling the operational state of the household appliance, the transmission of the control signals being performed according to a schedule. Further, the control device is configured to receive the transmitted control signals from the central controller and to control the operational state of the household appliance in response to the control signals. In some implementations, the central controller is configured to generate the schedule based at least in part on predicted market prices for electricity and on a user-selected comfort level for the household appliance. In certain implementations, the control device coupled to the household appliance further comprises an override switch configured to override the control signals from the central controller for a period of time. In certain implementations, the control device coupled to the household appliance is further configured to receive status information about the operational state of the household appliance from the household appliance and to transmit the status information to the central controller. In some implementations, the central controller is configured to receive information about a current market price for electricity and to transmit data indicative of the current market price to the control device, and the control device is configured to display an indication of the current market price based on the transmitted data. In certain implementations, the household appliance is a thermostatically controlled household appliance and the control signals include data indicative of a temperature setting at which the household appliance is to be set. In some implementations, the household appliance is a non-thermostatically controlled household appliance and the control signals include data indicative of a performance setting at which the household appliance is to be set. In certain implementations, the control device coupled to the household appliance is a first control device coupled to a first household appliance, the control signals are first control signals, and the system further comprises a second control device coupled to a second household appliance. In these implementations, the central controller can be further configured to generate and transmit second control signals for controlling an operational state of the second household appliance, the transmission of the second control signals also being performed according to the schedule. In some implementations, the central controller is further configured to display a graphic user interface, the graphic user interface being operable to receive data indicative of preferred operational times for the household appliance and preferred performance settings of the household appliance.

Embodiments of the disclosed methods can be performed using computing hardware, such as a computer processor or an integrated circuit. For example, embodiments of the disclosed methods can be performed by software stored on one or more non-transitory computer-readable media (e.g., one or more optical media discs, volatile memory components (such as DRAM or SRAM), or nonvolatile memory or storage components (such as hard drives)). Such software can be executed on a single computer or on a networked computer (e.g., via the Internet, a wide-area network, a local-area network, a client-server network, or other such network). Embodiments of the disclosed methods can also be performed by specialized computing hardware (e.g., one or more application specific integrated circuits (ASICs) or programmable logic devices (such as field programmable gate arrays (FPGAs)) configured to perform any of the disclosed methods). Additionally, any intermediate or final result created or modified using any of the disclosed methods can be stored on one or more non-transitory storage medium (e.g., one or more optical media discs, volatile memory or storage components (such as DRAM or SRAM), or nonvolatile memory or storage components (such as hard drives)). Furthermore, any of the software embodiments (comprising, for example, computer-executable instructions for causing a computer to perform any of the disclosed methods), intermediate results, or final results created or modified by the disclosed methods can be transmitted, received, or accessed through a suitable communication means.

The foregoing and other objects, features, and advantages of the invention will become more apparent from the following detailed description, which proceeds with reference to the accompanying figures.

BRIEF DESCRIPTION OF THE DRAWINGS

FIG. 7 is a second screen shot of an exemplary graphic user interface for implementing an embodiment of a house load scheduler according to the disclosed technology.

DETAILED DESCRIPTION

I. General Considerations

Figure 1:
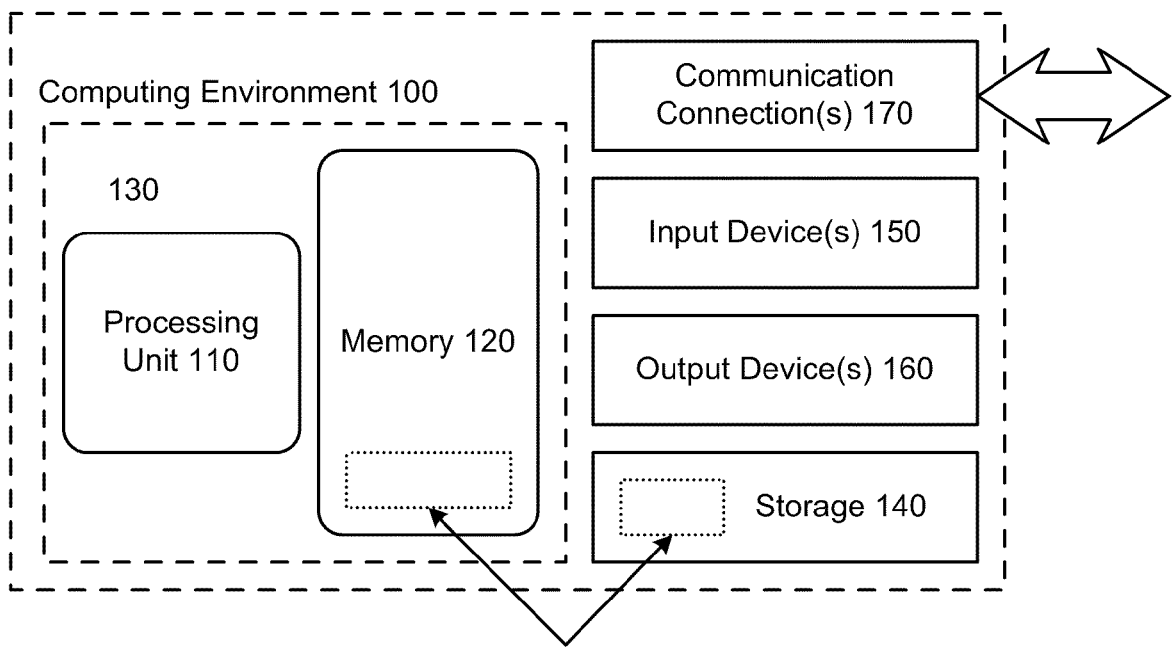
FIG. 1 is a schematic block diagram illustrating an exemplary computing environment in which embodiments of the disclosed technology can be implemented.

Disclosed below are representative embodiments of methods, apparatus, and systems for controlling and scheduling power distribution in a power network, such as household power network. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer). Any of the computer-executable instructions for implementing the disclosed techniques (e.g., the disclosed scheduling or control techniques) as well as any intermediate or final data created and used during implementation of the disclosed methods can be stored on one or more computer-readable media (e.g., non-transitory computer-readable media). The computer-executable instructions can be part of, for example, a dedicated software application or a software application that is accessed or downloaded via a network (e.g., through a web browser). Such software can be executed on a single computer (e.g., any suitable commercially available computer) or in a network environment (e.g., via the Internet, a wide-area network, a local-area network, a client-server network, a cloud computing network, or other such network).

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, Java, Perl, JavaScript, Adobe Flash, or any other suitable programming language. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to an electronic device (e.g., a specialized controller or household appliance) that is configured to operate in any of the disclosed systems. For example, the integrated circuit can be embedded in or otherwise coupled to a controller, an air-conditioning unit; heating unit; heating, ventilation, and air conditioning ("HVAC") system; hot water heater; refrigerator; dish washer; washing machine; dryer; oven; microwave oven; pump; home lighting system; electrical charger, electric vehicle charger/discharger; distributed generator; or home electrical system.

FIG. 1 illustrates a generalized example of a suitable computing hardware environment 100 in which many of the described embodiments can be implemented. The computing environment 100 is not intended to suggest any limitation as to the scope of use or functionality of the disclosed technology, as the tools and techniques described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 can be volatile memory (e.g., registers, cache, RAM), non-volatile memory (e.g., ROM, EEPROM, flash memory), or some combination of the two. The memory 120 stores software 180 for implementing one or more of the described techniques. For example, the memory 120 can store software 180 for implementing any of the disclosed household load scheduling or appliance control strategies described herein and their accompanying user interfaces.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory storage medium which can be used to store information and which can be accessed within the computing environment 100. The storage 140 can also store instructions for the software 180 implementing any of the described techniques, systems, or environments.

The input device(s) 150 can be a touch input device such as a keyboard, mouse, touch screen, pen, trackball, a voice input device, a scanning device, or another device that provides input to the computing environment 100. The output device(s) 160 can be a display, printer, speaker, CD-writer, or another device that provides output from the computing environment 100.

The communication connection(s) 170 enable communication over a communication medium to another computing entity. The communication medium conveys information such as computer-executable instructions, appliance status or control messages or data, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-executable instructions stored on one or more computer-readable media. By way of example, and not limitation, with the computing environment 100, computer-readable media include tangible non-transitory computer-readable media such as memory 120 and storage 140. The various methods, systems, and interfaces disclosed herein can also be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Embodiments of the Disclosed Technology

A. Introduction to the Disclosed Technology

Real-time pricing will eventually become available in many power markets. Furthermore, it appears that the power system capacity margin will gradually decrease as a result of new power generation and transmission facilities not being developed quickly enough. As a result, there exists a growing need for the electrical load serviced by the power system to become "smarter." For example, a smart load can be responsive to price signals, and thereby create a more elastic load that does not exceed the power supply. Additionally, a smart load can participate in ancillary services, as well as facilitate system restoration processes when faults occur.

In particular embodiments of the disclosed technology, a system of electronic devices is provided in which the electronic devices are controlled so that the electricity consumption of the devices helps the grid operate safely and helps reduce the energy costs without sacrificing comfort. The system of electronic devices can comprise, for example, electrical devices in a household electrical system; electrical devices in an electrical system for a single business, building, store, floor, or other common enterprise; electrical devices in an electrical system under the control of a single electrical consumer; or any other system of two or more electrical devices whose power consumption is desirably controlled together to improve the overall load characteristics of the system and/or to decrease power costs. For ease of presentation, however, the discussion below will describe the disclosed technology in the context of a household electrical system. It is to be understood that the disclosed technology should not be limited to such a usage, as it can be more generally applied.

In contrast to conventional approaches where individual devices each have their own individual controls and are not centrally controlled or otherwise in communication with one another, embodiments of the disclosed technology use a central controller to control power usage throughout the system. Compared with appliance-level control, embodiments of the disclosed technology can exhibit one or more of the following desirable characteristics: (1) a better user interface to operate appliances; (2) a single interface to control multiple appliances, which provides a cost effective, flexible, and efficient platform for control and coordination among the appliances; (3) more privacy to the house owner by masking the information of individual appliance usage; and/or (4) a better communication and control platform for a utility to reach out to a household load. Embodiments of the disclosed technology can be used as part of an energy management system that produces a controllable and observable load, enhances the stability of the energy markets, enhances grid reliability, and/or makes the power grid a more resilient and robust system.

B. Embodiments of a "Smart House" System

Figure 2:
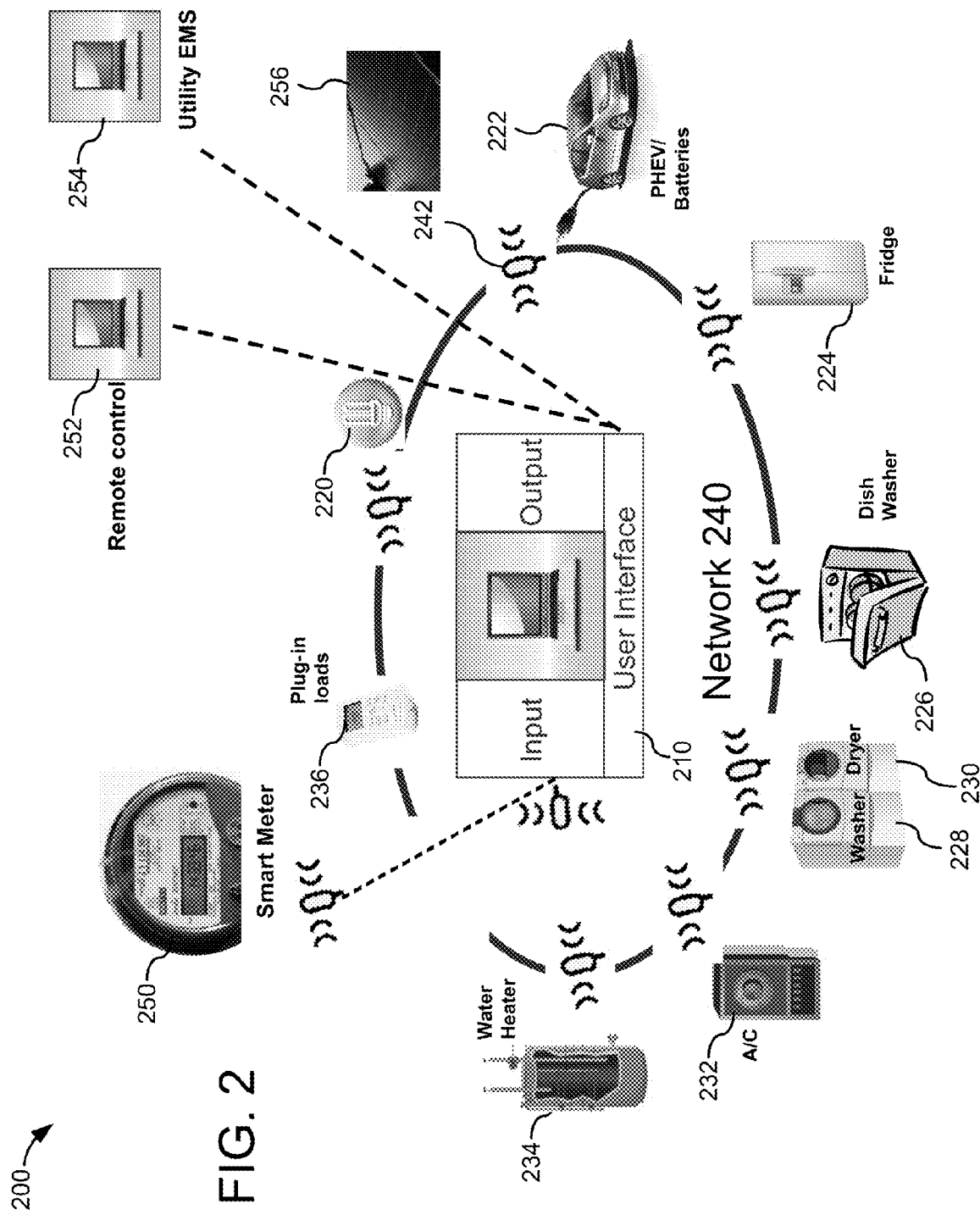
FIG. 2 is a schematic block diagram illustrating an exemplary network comprising a central controller configured to implement a house load scheduler and associated electronic devices.

FIG. 2 is a schematic block diagram that illustrates a household electrical system 200 as can be implemented using embodiments of the disclosed technology. The system 200 comprises a central controller 210 (e.g., a computer having one or more input devices, one or more output devices, and a user interface) that is configured to communicate with one or more household devices or systems. For instance, in the illustrated embodiment, the household devices or systems include household lighting system 220, a plug-in hybrid electric vehicle ("PHEV") 222, refrigerator 224, dish washer 226, washer 228, dryer 230, heating and/or air conditioning unit 232, water heater 234, and one or more plug-in loads 236 (e.g., computers, cell phone adapters, TVs, stereo systems, or any other electrical device). In some embodiments, distributed generators ("DGs") and energy storage devices ("EDSs") are also coupled to the central controller 210 and used as additional generation resources available for use in powering any of the household devices 220-236. For example, the batteries of the PHEV 222 can be used as a resource or a load. Similarly, a power generation system 256 (e.g., one or more solar panels, wind generators, fuel cells, or other such power generators) can be coupled to the 200 and used to supply extra power when available.

The central controller 210 and any one or more of the household devices 220-236 can comprise a computing device having a computer architecture as shown in FIG. 1 and discussed above. For example, the central controller 210 can be a personal computer, and the household devices 220-256 can include one or more embedded computing devices (e.g., one or more embedded systems). The central controller 210 or any of the household devices 220-256 can also comprise specialized computing hardware (such as an ASIC or programmable logic device) configured to perform any of the disclosed methods).

In the illustrated embodiment, the central controller 210 communicates with the one or more household devices 220-236 over a network 240, which can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, 802.11n, 802.15.4-2006 or other appropriate standard). In the illustrated embodiment, for instance, the network 240 is a wireless network implemented using transceivers 242 (only one of which is labeled for ease of illustration) that are coupled to each of the central controller 210 and the household devices 220-256. In other embodiments, the network 240 is a mix of wireless and wired connections.

In certain embodiments, the household devices are equipped with an input/output ("I/O") communication board designed to enable communication with each individual device. As more fully explained below, the I/O communication board can be a standardized board that is configured to be used with any individual device. For example, the I/O communication board can be used to retrofit an individual electronic device (e.g., by coupling the I/O communication board to existing control hardware in the electronic device or by coupling the I/O communication board directly to the power cord of the device, thereby creating a "smart switch" or "smart outlet") or can be included as an original part of the individual device (e.g., the I/O communication board can be installed during the manufacture of the electrical device). The central controller 210 can also include or be coupled to a specialized I/O communication board. In other embodiments, internal wireless or networking capabilities of the central controller 210 are used (e.g., the internal wireless transceiver of a computer).

In the illustrated embodiment, the central controller 210 is further configured to receive price information concerning the current price of electricity. This information can be transmitted, for example, from a smart meter 250 associated with the electrical system 200 (e.g., a smart meter for tracking power usage for a household or business). In the illustrated embodiment, the smart meter 250 transmits this information wirelessly, though in other embodiments the information is transmitted via a dedicated wire. The smart meter 250 can obtain the price information through a variety of mechanisms, such as wirelessly, through the Internet, or through dedicated communication lines. In other embodiments, the central controller 210 is configured to receive the price information via the Internet or other networked communication line. For example, the central controller can be networked to a server 254 at the local utility that transmits the price information on a periodic basis. The price information can comprise, for example, the current price of power and can be updated on a periodic basis (e.g., every 15 minutes, every hour, or any other suitable time period).

In some embodiments, the central controller 210 can be accessed remotely and updated via a remote control device 252. The remote control device can be, for example, another computer (e.g., a laptop), a smart phone, or any other such device. In certain embodiments, the settings of the central controller 210 can be stored remotely (e.g., at a remote server) and updated remotely (e.g., by accessing the server remotely via the Internet).

The various possible roles and functionalities of the central controller 210 and of the household devices 220-256 will be described in more detail in the following sections.

In certain embodiments, the central controller 210 implements a household load scheduler ("HLS") that uses centralized control procedures to commit, control, and coordinate the operation of household appliances (such as any one or more of household devices 220-256) so that different control objectives can be efficiently implemented at a household level. In particular embodiments, the HLS includes a user interface that allows a user to select any one or more of the following: comfort levels, price caps, appliance must-run periods, and control objectives. The HLS can interpret the user settings as constraints and commit appliances based on a price forecast (e.g., a 24-hour price forecast). For example, the HLS can process the user inputs and generate appliance operation schedules based on a user-selected operational parameters, which define the user's control objectives. The control objectives can be, for example, one or more of the following: reducing energy costs, providing ancillary services, responding to voltage and frequency signals, following a predefined load shape, or achieving a desired comfort level. The HLS can also collect appliance operation status, market price information, power system voltage and frequency, and other such signals and parameters that can affect any of the HLS's control objectives. Additionally, the HLS can be configured to cause the transmission of control signals to one or more of the household devices (e.g., control signals for turning a device on or off, signals for adjusting a thermostat, or other such control signals). In particular embodiments, the HLS uses two databases during its operation: a database comprising the records and fields used in controlling the household appliances controlled by the HLS (sometimes referred to as the HLSSYS database) and a database containing logs (sometimes referred to as the HLSLOG database). The HLSLOG database can be used to record and maintain data concerning actual usage data obtained from the household appliances or the smart meter, or historical price information for use in developing price forecasts.

In certain embodiments of the disclosed technology, an information display is coupled to or associated with any one or more of the household devices controlled by the HLS. The information display can be an LED, LCD, plasma, or any other suitable display device. In particular implementations, the information display is a passive device that is controlled by signals received from the central controller.

The information display can be configured to present a variety of types of information, such as a current price or current status of the household device.

In some embodiments of the disclosed technology, the I/O communication board is coupled to or associated with any one or more of the household devices. The I/O communication board can be configured to collect data concerning the current status of the associated household device and transmit this data to the HLS. The I/O communication board can additionally be configured to receive control signals from the HLS and transmit the signals to a control board of the associated household device, thereby modifying the operational state of the household device.

In some implementations, the information display and the I/O communication board are implemented together as a common device, sometimes referred to herein as an "appliance control device" or just "control device". In other implementations, the information display and I/O communication board are implemented separately. In still further implementations, the information display is implemented without the I/O board or vice versa.

The information display and I/O board can communicate with the HLS or each other using a wireless network, such as a wireless network implemented according to the ZigBee specification. For instance, the information display and I/O communication board can be implemented together as an integrated ZigBee device (e.g., a ZigBee smart switch).

Figure 3:
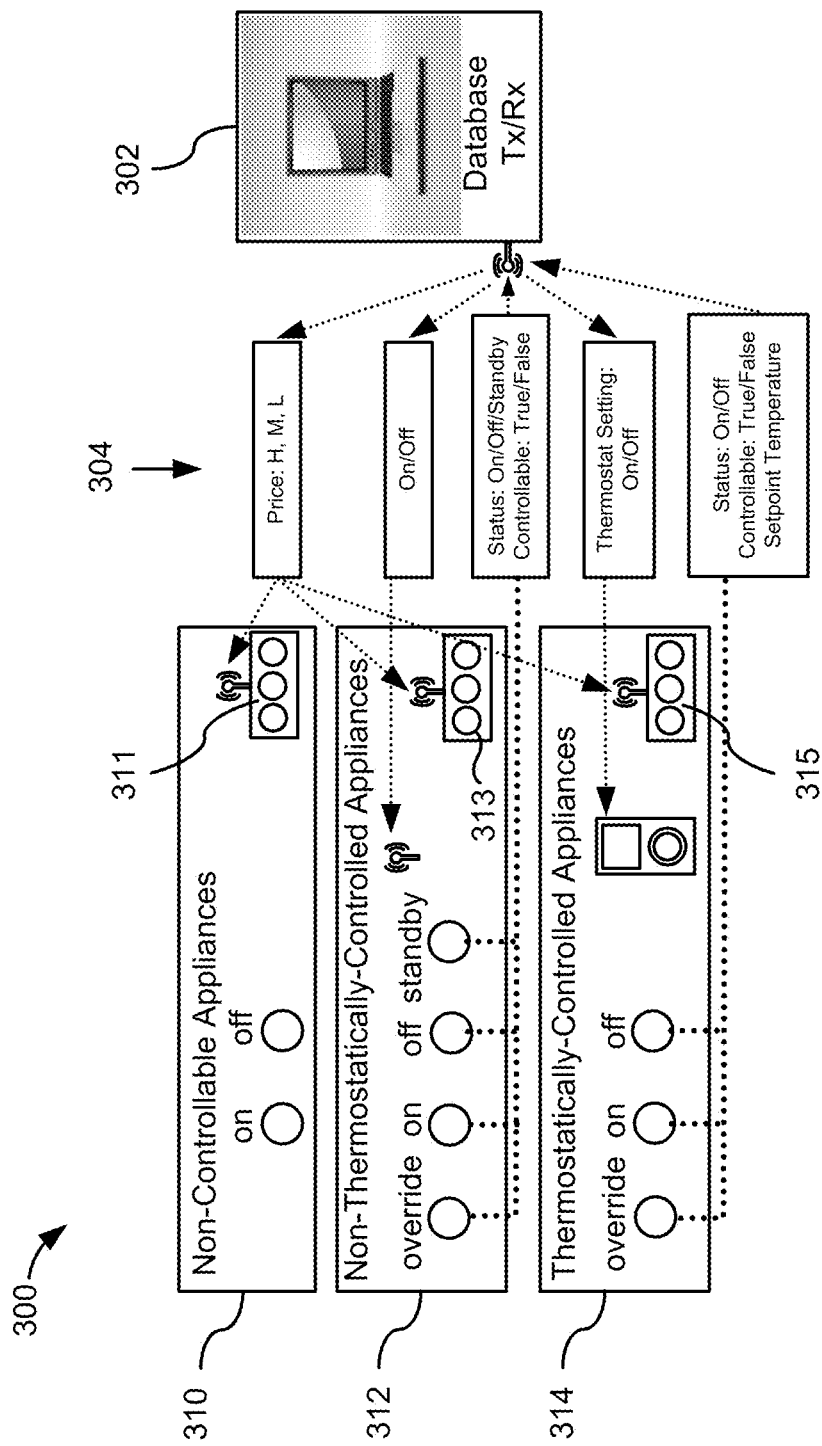
FIG. 3 is a schematic block diagram illustrating possible communications between the central controller and the electronic devices of FIG. 2.

FIG. 3 is a schematic block diagram 300 showing possible communications 304 between an HLS 302 and the I/O communication boards (not shown) for three different types of electrical devices: a non-controllable appliance 310; a non-thermostatically-controlled appliance 312; and a thermostatically-controlled appliance 314. The communications between the HLS 302 and the I/O communication boards of the appliances 310, 312, 314 can occur periodically or as needed (e.g., upon request by the HLS). In the illustrated embodiment, the communications are wireless. The communications can also be implemented over a wired network or a combination of a wireless and wired network. The appliances shown in FIG. 3 additionally include information displays 311, 313, 315. The information displays 311, 313, 315 are used to indicate whether the current market price for power is high (shown by a red light), medium (shown by a yellow light), or low (shown by a green light).

For the non-controllable appliance 310, the HLS 302 transmits price data concerning the current market price of power. The price data can include actual price information or information indicating the price level (high, medium, or low) of the current market price. As more fully explained below, the limits for these price levels can be adjusted (e.g., through a user interface). Furthermore, although only three price levels are shown, additional price levels are also possible. In certain embodiments, the status of the non-controllable appliance 310 can also be transmitted to the HLS 302. For example, in the illustrated embodiment, the non-controllable appliance 310 has two states: on and off. Data indicative of whether a non-controllable appliance is on or off can be transmitted to the HLS 302.

For the non-thermostatically-controlled appliance 312, the HLS 302 transmits price data concerning the current market price of power as well as control data indicating the operational state to which a respective appliance should be switched (e.g., on or off). The non-thermostatically-controlled appliance 312 can include a switching mechanism that is responsive to the control data and that is configured to alter the state of the appliance. The switching mechanism can be, for example, integrated into the appliance, retrofit onto the appliance by being directly coupled to the control board of the appliance, or retrofit to the appliance by being coupled to the power cord of the appliance (e.g., a switching mechanism located at the power outlet for the appliance). In the illustrated embodiment, the I/O communication board of the non-thermostatically-controlled appliance 312 is further configured to transmit information about the appliance's current operational status and/or its controllability to the HLS 302. For example, the I/O communication board of the non-thermostatically-controlled appliance 312 can transmit information indicating that the appliance is on, off, or in a standby state (indicating that the appliance is off but ready to receive control data to turn it on). The I/O communication board of the non-thermostatically-controlled appliance 312 can also transmit information indicating that the appliance is in a controllable state (e.g., that the appliance's controllability has not been overridden by a local user) or that it is a non-controllable state (e.g., the appliance's controllability has been overridden). For example, the non-thermostatically-controlled appliance 312 can be equipped with an "override" button, which when activated by the customer overrides the HLS and causes the I/O communication board to send a "non-controllable" signal. The HLS can consequently cancel scheduled actions for as long as the appliance is in its non-controllable state. In certain implementations, for example, the non-thermostatically-controlled appliance remains in the override state for the remainder of the day or for some other predetermined or user-selected time period. At the expiration of the override time period (e.g., at the start of the next day), the appliance can return to its controllable state. In other implementations, the override state can last indefinitely until the user selects to alter the state. Depending on the particular function and capabilities of the appliance, the I/O communication board of the non-thermostatically-appliance 314 can transmit or receive additional signals to or from the HLS. For example, a dryer or dishwasher typically has two performance modes when operating: the normal mode and the power saving mode. In power saving mode, the appliance can reduce its consumption by 20%. The communications for a dryer or dishwasher (or other such appliance) can therefore additionally include control signals for setting the dryer or dishwasher into the normal mode or power saving mode and data signals for indicating that the dryer or dishwasher is in either the normal mode or power saving mode.

For the thermostatically-controlled appliance 314, the HLS 302 transmits price data concerning the current market price of power as well as control data indicating the operational state to which the appliance should be switched (e.g., on or off as well as a desired thermostat setting). As with the non-thermostatically-controlled appliance 312, the thermostatically-controlled appliance 314 can include a switching mechanism that is responsive to the control data and that is configured to alter the operational state of the appliance. The switching mechanism of the thermostatically-controlled appliance 314 is further configured to be coupled to and control the thermostat of the appliance, thus allowing the set point of the thermostatically-controlled appliance 314 to be controlled by the HLS. In the illustrated embodiment, the thermostatically-controlled appliance 314 is further configured to transmit information about its current status and/or its controllability to the HLS 302. For example, the thermostatically-controlled appliance 314 can transmit information indicating that the appliance is on, off, or in a standby state (not shown). The I/O communication board of the thermostatically-controlled appliance 314 can also transmit information indicating that it is in a controllable state (e.g., that its controllability has not been overridden by a local user) or that it is in a non-controllable state (e.g., its controllability has been overridden). In certain embodiments, for example, the thermostatically-controlled appliance is equipped with an override button, which can operate as explained above. The thermostatically-controlled appliance 314 can additionally transmit information indicating the current set point of the thermostat of the appliance as well as the current temperature of the appliance. Depending on the particular function and capabilities of the appliance, the thermostatically controlled appliance 314 can transmit or receive additional signals to or from the HLS.

Figure 4:
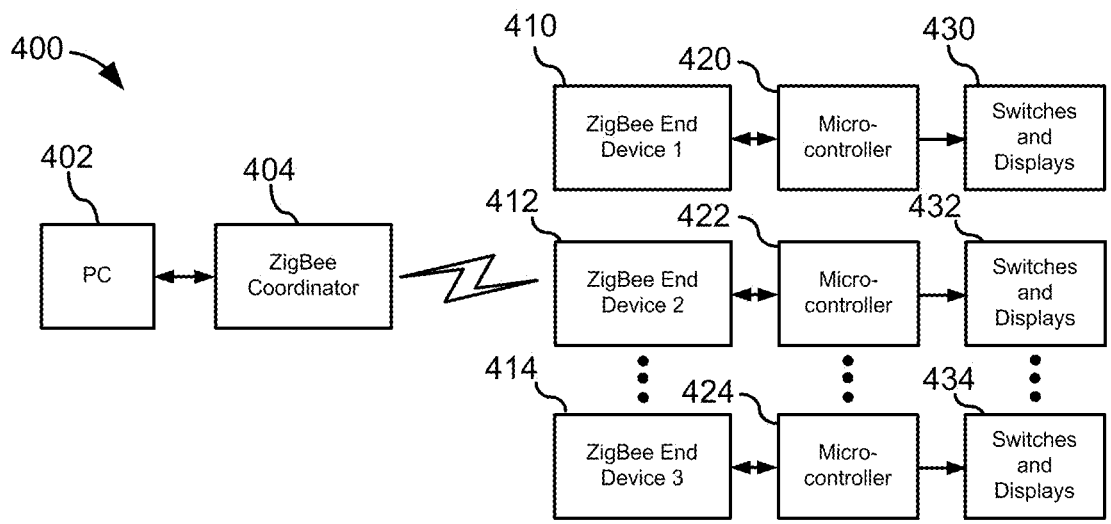
FIG. 4 is a schematic block diagram illustrating exemplary components that can be used to implement the network of FIG. 2.

FIG. 4 is a schematic block diagram 400 illustrating components and communication links for an exemplary embodiment of the system of FIG. 2. The exemplary embodiment of FIG. 4 includes a ZigBee coordinator 404 (coupled to a central controller 402) and multiple ZigBee end devices 410, 412, 414, each of which can be located at and coupled to a respective household appliance. The ZigBee end devices are configured to transmit and receive the communications from the ZigBee coordinator according to the ZigBee specification. The central controller 402 is coupled to a ZigBee coordinator 404 via a suitable connection (e.g., a USB connection). The ZigBee coordinator 404 is also configured to transmit and receive the various communications (such as the communications discussed above with respect to FIG. 3) according to the ZigBee specification. In the illustrated embodiment, the ZigBee end devices 410, 412, 414 are each coupled to respective microcontrollers 420, 422, 424 and switches/displays 430, 432, 434 at each of the appliances. The microcontrollers 420, 422, 424 can be configured to operate the respective displays 430, 432, 434 and to cause the ZigBee end devices 410, 412, 414 to transmit the appropriate signals upon activation of the respective switches 430, 432, 434. The ZigBee end devices 410, 412, 414 and their respective microcontrollers 420, 422, 424 can be coupled to and form part of respective I/O communication boards. Collectively, a ZigBee end device, microcontroller, and display can form at least part of an appliance control device used to control a respective household appliance in response to signals from the central controller 402. Although the embodiment illustrated in FIG. 4 uses the ZigBee communication protocol and ZigBee devices, other wired or wireless protocols, or other suitable hardware could be used.

Figure 5A:
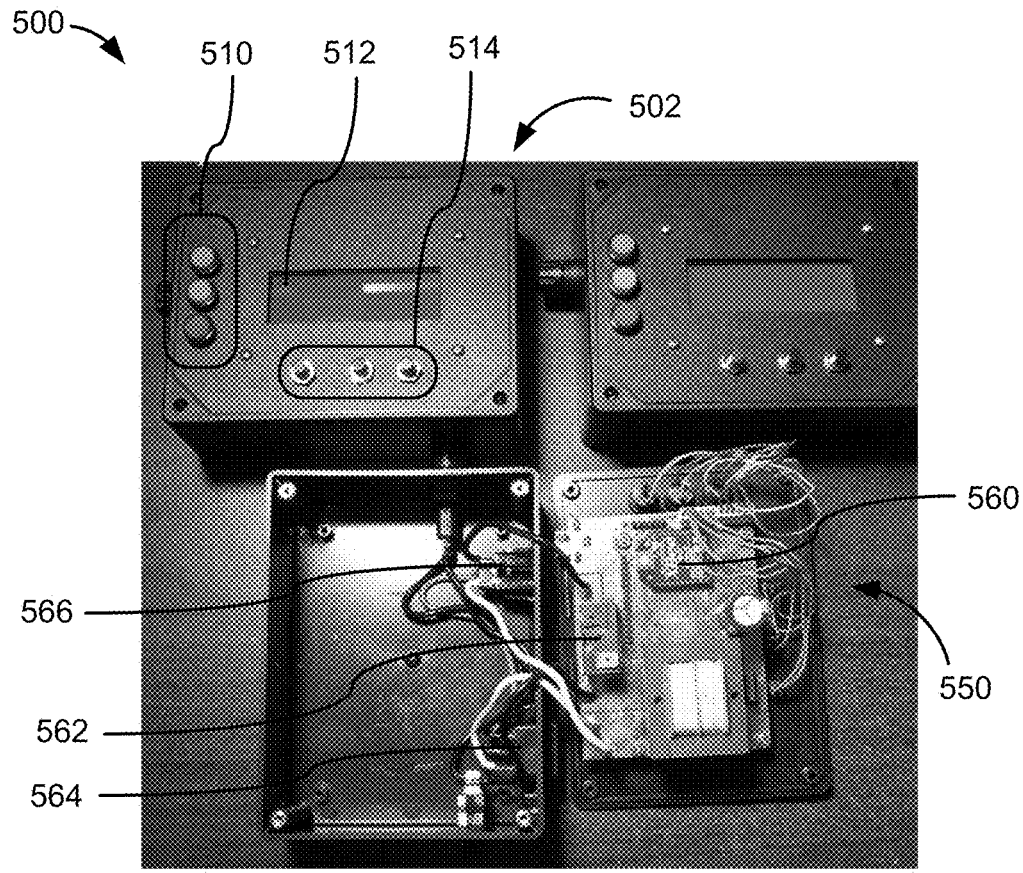
FIG. 5A is an image showing an exemplary control device that can be used in the network of FIG. 2.

FIG. 5A is an image 500 showing three exemplary appliance control devices, which each comprise a ZigBee end device, a microcontroller, switches, and a display. For example, the control device 502 includes three lights 510 (e.g., LED lights), which can be used to display a current price range for electricity in response to the communications from the central controller 210. For example, when the current market price of electricity is in the high range, a red light can be activated; when the current market price is in the medium range, a yellow light can be activated; and when the current market price is in the low range, a green light can be activated. The control device 500 additionally includes a display device 512 (e.g., an LCD display) for conveying information to the user. For example, the display device 512 can be used to display the current electric rate to a user. The control device 500 further includes switches 514, which can comprise an "on" switch, and "off" switch, and an "override" switch. FIG. 5A also shows appliance control device 550, which reveals the interior of the exemplary units. As seen in FIG. 5A, the control device 550 includes an RF module 560 (here, an XBee PRO Series 2 equipped with a chip antenna) and switch hardware 562. The switch hardware 562 can include appropriate hardware to be coupled to a control board or to control signals of an appliance in order to monitor and/or control the appliance's operational state. For example, the hardware can be configured to monitor any of the operational signals of an appliance as well as to interrupt and substitute new control signals based on the control signals from the central controller 210. In the illustrated embodiment, the control device 550 includes a port 564 configured to receive the end of a power cable (e.g., a power cable configured to plug into an electrical outlet). The control device 550 further includes a port 566 configured as a standard power outlet and configured to receive a plug (e.g., the plug of a household appliance). The switch hardware 562 of the illustrated embodiment is further configured to supply power to the port 566 when the appropriate "on" control signal is received and to stop the supply of power to the port 566 when the appropriate "off" control signal is received. In this way, the control device 550 operates as a "smart switch" or "smart outlet."

Figure 5B:
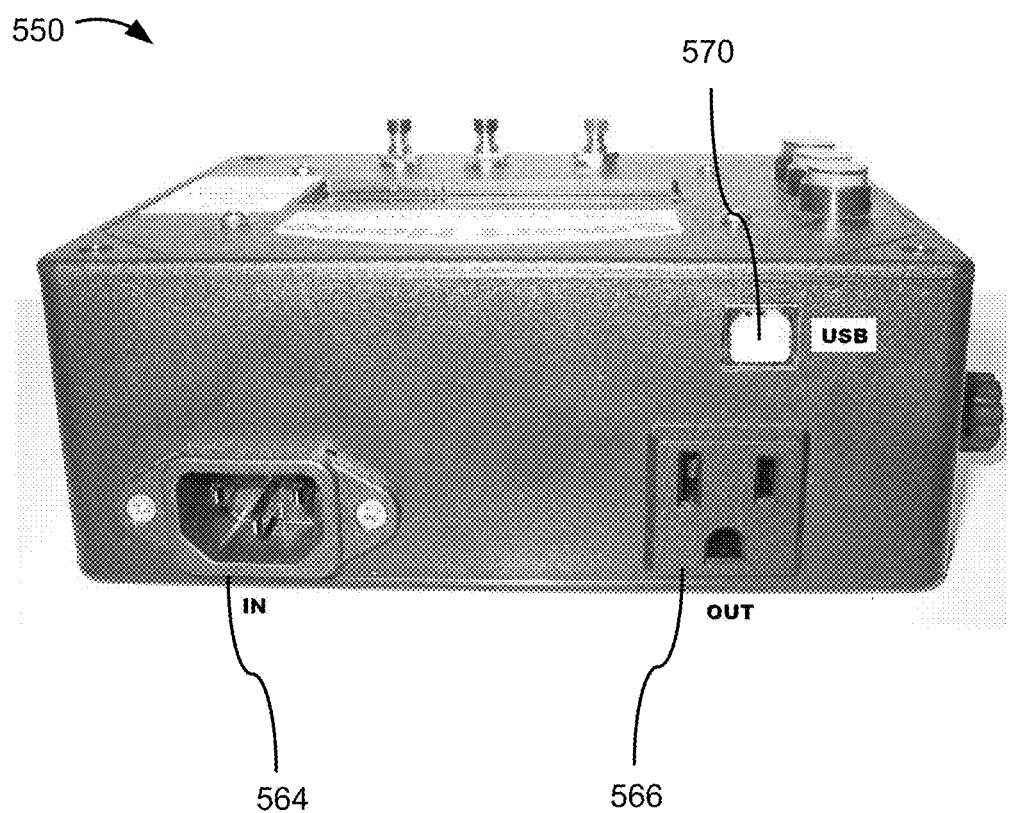
FIG. 5B is an image of the side of the exemplary control device shown in FIG. 5A.

FIG. 5B is an image showing a side view of the control device 550. The ports 564 and 566 are shown in FIG. 5B. Also shown in FIG. 5B is a USB port 570 that can alternatively or additionally be used to couple the control device 550 to an electrical appliance. In certain implementations, data for monitoring the status of the electrical appliance or controlling the electrical appliance can be received and transmitted through the USB port.

It should be noted that the exemplary control devices shown in FIGS. 5A and 5B can operate as active devices (devices that perform switching operations in response to control signals from the central controller) or as passive devices (devices that do not perform switching operations). For example, as a passive device, the control device can simply be used to display to a user the current price range for power using the display device 512 and the lights 510. Furthermore, although the embodiments illustrated in FIGS. 5A and 5B use ZigBee components, it should be understood that suitable hardware for other wired or wireless protocols could also be used.

Figure 6:
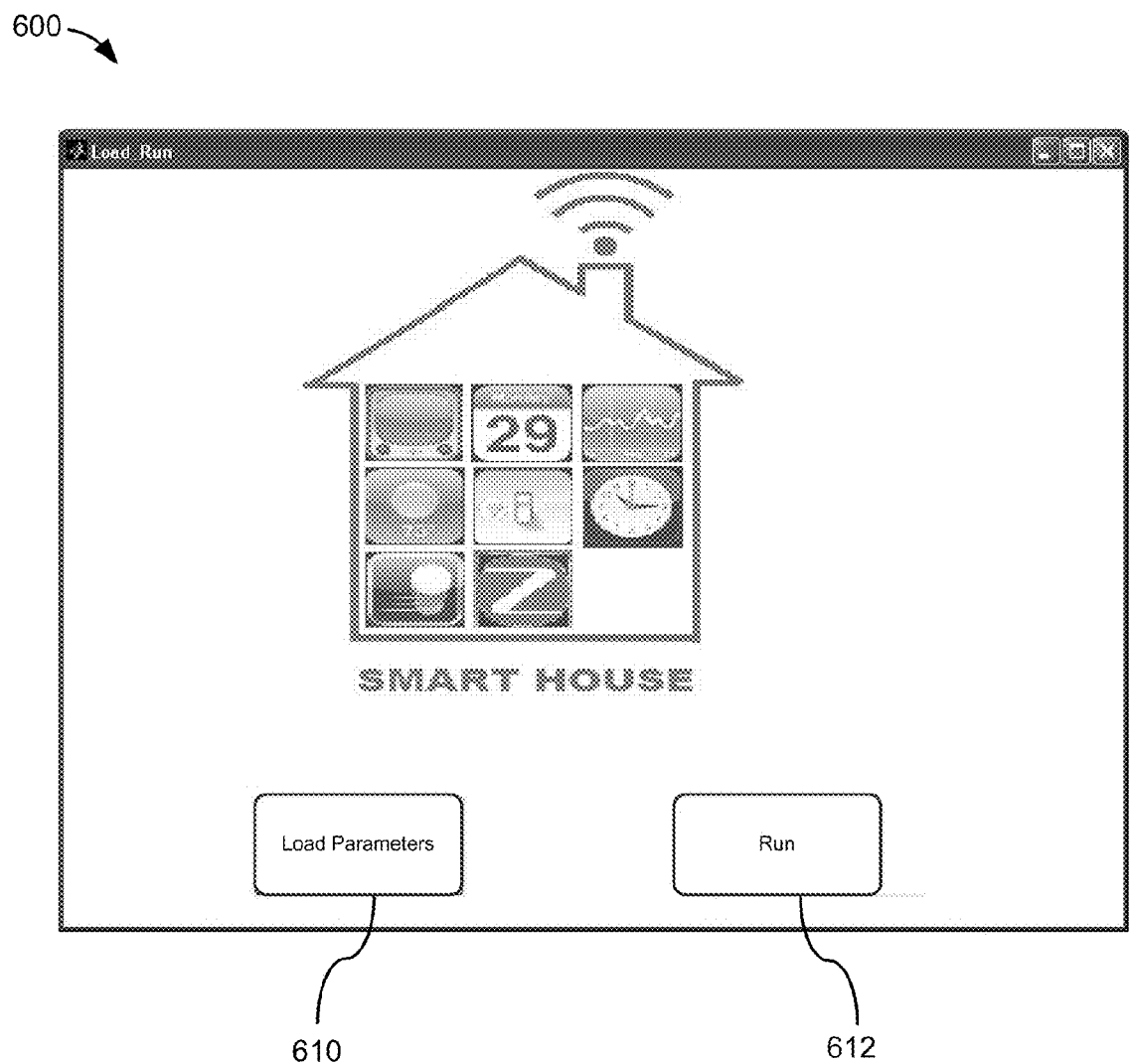
FIG. 6 is a first screen shot of an exemplary graphic user interface for implementing an embodiment of a house load scheduler according to the disclosed technology.
Figure 8:
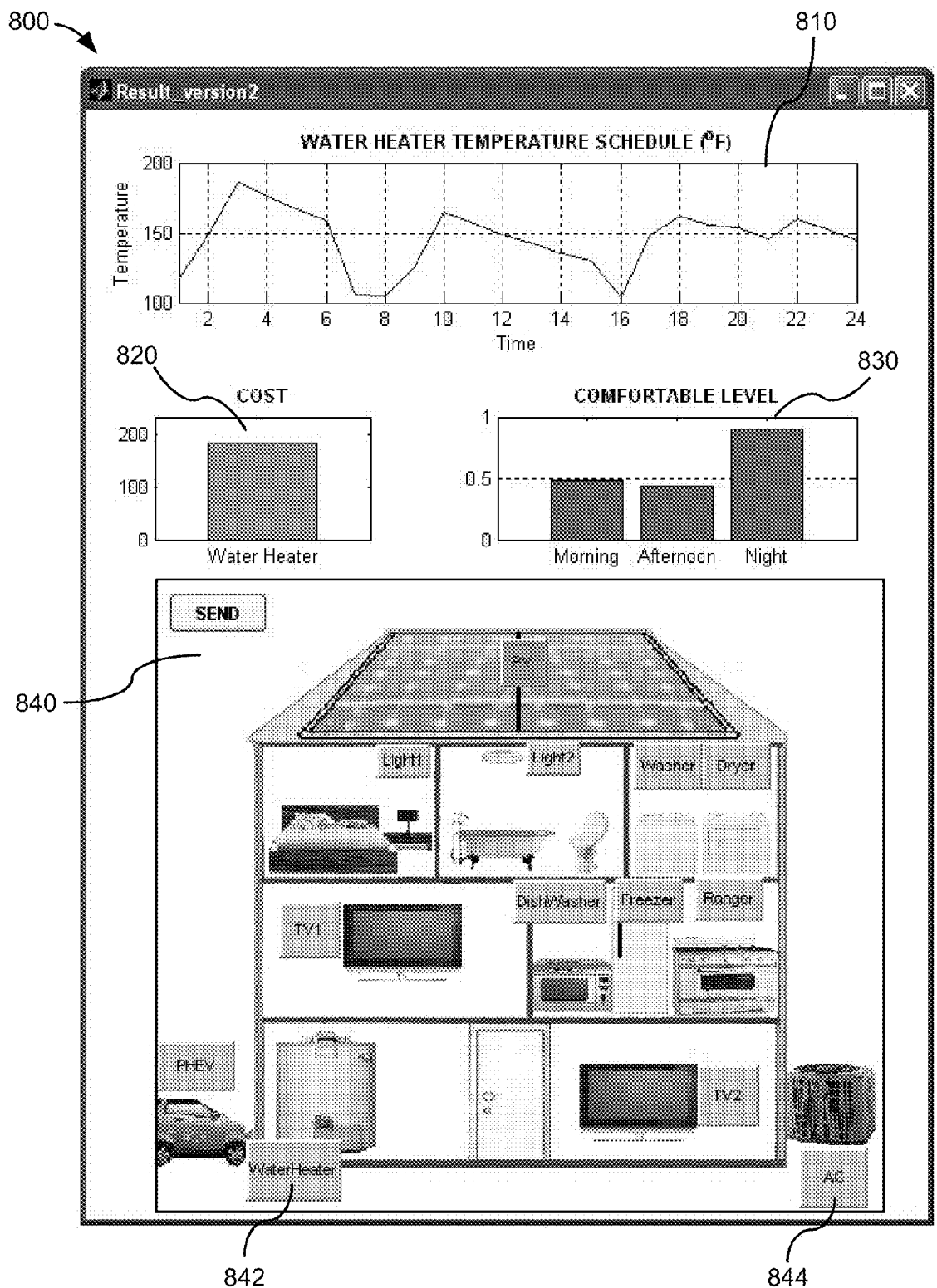
FIG. 8 is a third screen shot of an exemplary graphic user interface for implementing an embodiment of a house load scheduler according to the disclosed technology

FIGS. 6-8 show user interfaces 600, 700, 800 from an exemplary HLS implemented on a central controller (such as central controller 210 shown in FIG. 2.) The illustrated user interfaces 600, 700, 800 should not be construed as limiting, as they only show examples of the functionality and look-and-feel of one exemplary embodiment. Any of the displayed or discussed functionality can be realized using a wide of variety of different user interface designs.

FIG. 6 is a screen shot of a user interface 600 that can be displayed to a user of an HLS when the HLS is first launched. User interface 600 presents two choices to the user: load parameters (load parameter button 610) and run (run button 612). The user can select the load parameter button 610 in order to input or modify any of the operational parameters used to control or otherwise influence the household appliance schedule. The user can also select the run button 612 in order to apply the operational parameters that have been previously input, develop a load schedule for the one or more household appliances controlled by the HLS, and to transmit and receive the various communications used to implement the schedule.

FIG. 7 is a screen shot of a user interface 700 that can be displayed to a user of the HLS to allow the user to view, input, and/or modify various operational parameters concerning the operation of the HLS. Column 710 includes the identities of the various household appliances that are to be controlled, monitored, or otherwise accounted for by the HLS. At column 710 the user can add, delete, or edit any of the household appliances, which can be categorized into one or more categories of appliance type. For example, in the illustrated embodiment, three categories of appliances are shown: thermostatically controlled appliances 750, non-thermostatically controlled appliances 752, and non-controllable appliances 754. A user can input a new appliance by either selecting the appliance type from a predetermined list of devices and/or by inputting the identification of the new appliance.

Column 712 indicates the power rating for an appliance. Column 712 can be populated by the user or, in certain embodiments, the power rating can be obtained from a database or other information source. An average power rating for a given appliance can be used in column 712 if the actual power rating is not known.

Column 714 indicates the controllability of the appliance. In the illustrated embodiment, the controllability is represented as a "1" (indicating that the appliance is controllable) or a "0" (indicating that the appliance is not controllable).

Column 716 indicates a status for the appliance. In the illustrated embodiment, the status is represented as a "1" (indicating an "on" operational state), a "0" (indicating a standby state), or "−1" (indicating an "off" operational state). The status shown in column 716 can be a current status of the appliance based on status signals transmitted from the appliance to the central controller.

Columns 718 indicate price limits. In the illustrated embodiment, for example, there are three price limits indicated: a low price limit (L), a mid-price limit (M), and a high-price limit (H). The mid-price limit (M) and the high-price limit (H) can be used to determine when the price of electricity is considered to "high." When the current market price for electricity exceeds the mid-price limit (M), data can be sent to the household appliances so that the appliances can display this information (e.g., using a red LED or other light). In some embodiments, the HLS can be configured to shut down an appliance when the current market price exceeds the high-price limit (H). Thus, if a user never wants an appliance to be turned "off" in response to a high power price, the user can set this value to its maximum value (e.g., "9999"). The low-price limit (L) and the mid-price limit (M) can be used to determine when the price of electricity is considered "medium." When the current market price for electricity exceeds the low-price limit (L) but is below the mid-price limit (M), data can be sent to the household appliances so that the appliances can display this information (e.g., using a yellow LED or other light). The low-price limit (L) works in a similar manner. When the current market price for electricity is below the low-price limit (L), data can be sent to the household appliances so that the appliances can display an indication that the price of electricity is low (e.g., using a green LED or other light).

Columns 720 indicate performance parameters for an appliance. The performance parameters can depend, for example, on the category that the household appliance is assigned to. For instance, for the thermostatically controlled appliances 750, three performance parameters can be set: a high temperature limit, a low temperature limit, and a preferred operating point (or preferred temperature setting). This information indicates the range of temperatures that are acceptable to the user according to his or her own comfort level and can be used by the HLS during the scheduling process to create a schedule that satisfies the user's comfort preferences. For the non-thermostatically controlled devices 752, three different performance parameters corresponding to the available control modes for the appliance can be set: a high performance mode limit, a low performance mode limit, and a preferred operating point (or preferred performance setting). For example, for a dishwasher, the dishwasher may be operable in a normal mode and an energy saving mode. The normal mode can correspond to control mode "2" whereas the energy saving mode can correspond to control mode "1".

Columns 722 indicate time periods during which the user prefers to operate the appliance. For example, in the illustrated embodiments, three different time periods are possible, each of which can have a different beginning point and a different ending point. In the illustrated embodiments, the entries correspond to a time on a 24-hour clock. Thus, for example, in the graphic user interface 700, the user has specified that the air conditioner should be operational from 6 a.m. to 8 a.m. and from 5 p.m. to 11 p.m. Although only three time periods are shown in FIG. 7, more or fewer time periods can be included in the graphic user interface 700.

As can be seen in FIG. 7, for the non-controllable appliances, only limited information can be input. This is because much of the information in the graphic user interface 700 is used to generate a schedule for controlling the operations of the controllable appliances.

When a user is finished adjusting the parameters in the graphic user interface 700, the user can select save button 756 to save the parameters (e.g., by storing the parameters in an appropriate database (such as the HLSSYS database) on one or more non-transitory computer-readable media) and return to a main menu of the HLS.

FIG. 8 is a screen shot of a user interface 800 that can be displayed to a user of the HLS to allow the user to view the status of one or more household appliances throughout the user's home. For example, the exemplary user interface 800 includes a region 810 that displays a current and historical state of a selected household appliance (in FIG. 8, the water heater). The user interface 800 additionally includes a region 820 that displays the cost (e.g., a normalized cost) of operating the selected household appliance according to the current schedule. Also shown in the user interface 800 is a region 830 that indicates the respective comfort levels for the current schedule during the course of the day (e.g., for the morning, afternoon, or night). The comfort level can be appliance specific and can be computed using Equation (5) below. User interface 800 also includes a region 840 in which additional status information about other appliances in the household is shown. For example, in the illustrated embodiment, the user interface 800 includes a representation of the household and its appliances, and displays selectable buttons next to each household appliance that is controlled by the HLS. In this example, the user can select any one of the household appliances in order to change the display on the user interface 800 to show status information about the selected household appliance. The buttons themselves can also be used to display status information. For instance, the button 842 adjacent to the water heater representation can indicate that the current operational state of the hot water heater is "off." Additionally, the button 844 adjacent to the air conditioner representation can indicate that the current temperature setting of the air conditioner is "24° C.".

C. Exemplary Methods for Scheduling Loads

In this section, exemplary techniques for scheduling the operation of one or more electronic devices are described. Embodiments of the described techniques can be used by the HLS, for example, to determine how to control and schedule the loads created by the one or more appliances that it communicates with (e.g., in a network, such as network 240).

1. Introduction

The disclosed techniques can be considered to be forms of a demand response program. In general, demand response programs increase demand elasticity, which moderate suppliers' ability to exercise market power to manipulate the price of electricity. Demand response programs can also help mitigate the adverse effects of integrating renewable resources into the power grid. In competitive electricity markets, there are generally two goals for a demand response program: to mitigate price volatility and to balance supply and demand. If the market price curve follows the load curve, the two goals yield the same result, which is to consume power during low-price and light-load periods and to curtail or reduce power consumption during the peak-price and heavy-load periods. If the price peaks do not coincide with the load peaks, the objective function for the optimization problem is either to mitigate price volatility or to balance the load.

The strategies that are typically applied in demand response programs include: curtailment, substitution (fuel switching), and load shifting. Load curtailment, as the name implies, curtails load during anticipated peak-price or peak-load periods. Load curtailment cuts off appliance electricity consumption during curtailment periods. It may or may not cause delayed consumptions (additional consumption after the loads come out of curtailment). Load shifting, as the name implies, shifts electricity consumption to pre- or post-peak periods to reduce consumption during the anticipated peak-price periods.

Load shifting can target the cyclic loads that are typically experienced by thermostatically controlled appliances (e.g., residential heating ventilation and air conditioning (HVAC) systems, electric water heaters, or refrigerators, such as HVAC system 232, water heater 234, or refrigerator 224 shown in FIG. 2). By varying the setting of the thermostat of a thermostatically controlled appliance, the period in which the appliance consumes power can be shifted by minutes or hours. If the set point is controlled in response to the market price, the shifted power consumption of a thermostatically controlled appliance can contribute substantially to load reduction during higher price periods. A thermostatically controlled appliance's power consumption is preferably shifted rather than curtailed when using embodiments of the disclosed technology. Thus, the electricity for the appliance will typically be consumed before or after any curtailment period.

Embodiments of the disclosed methods employ load control strategies that mitigate price volatility while maintaining satisfactory end-user comfort. In particular implementations, the load control strategies that are used are curtailment and load shifting. In particular implementations, a linear sequential optimal solution approach is used to determine a schedule for controllable appliances.

Embodiments of the disclosed methods are discussed below by using a hot water heater as an exemplary thermostatically controlled appliance that can be scheduled using the disclosed technology. A hot water heater is considered for example purposes only, and it is to be understood that the described analysis, modeling, and scheduling techniques can be more generally applied to one or more other appliances.

2. Water Heater Characteristics and Hot Water Usage

Before describing the exemplary scheduling techniques that can be used for controlling a hot water heater, the thermal characteristics of a typical hot water heater are considered by way of example. Water heaters use an energy source to heat water above its initial temperature. For example, water enters residences in the U.S. at about 10° C. (50° F.) (which varies with latitude and season). Hot water temperatures of about 40-49° C. (105-120° F.) are preferred for dish-washing, laundry, and showering, which requires the water temperature to be raised about 30° C. (54° F.) or more if the hot water is later mixed with cold water. In household and commercial usage, most water heaters in North America are of the tank type. Storage water heaters have the advantage of using energy at a relatively slow rate, storing the heat without significant heat loss in a well-insulated tank for later use.

Figure 9:
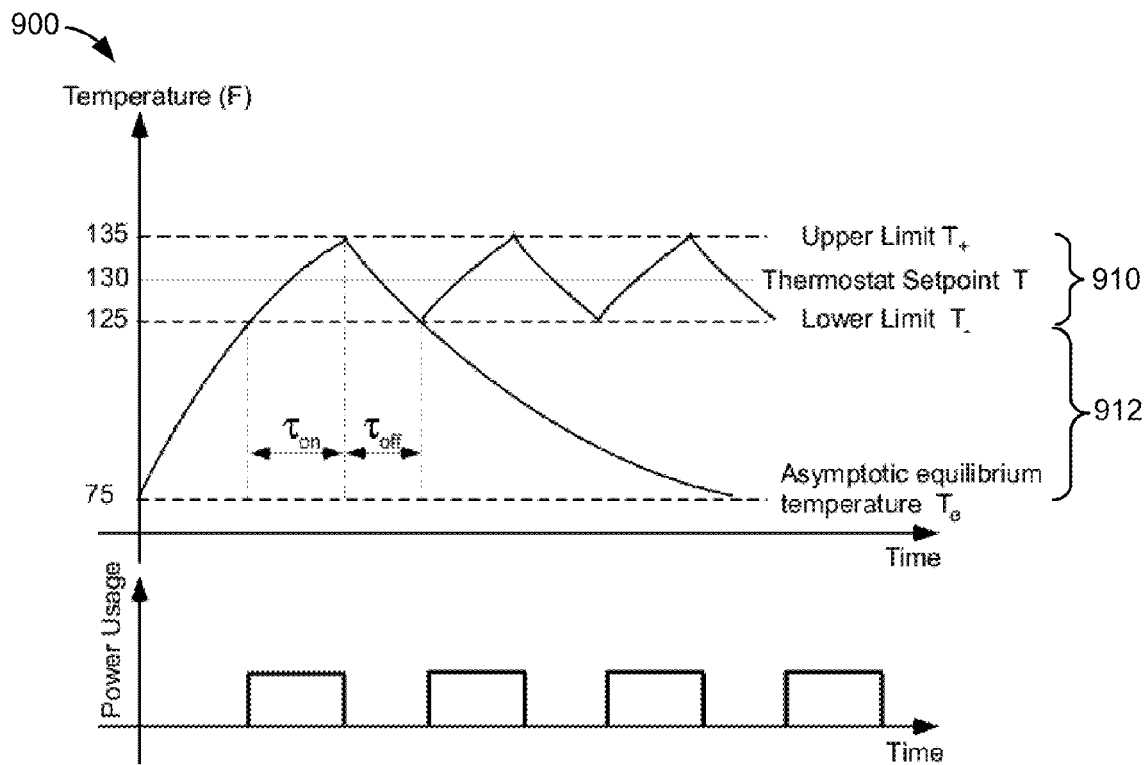
FIG. 9 is a graph illustrating behavior of an exemplary thermostatically controlled electronic device.

FIG. 9 is a graph 900 showing the thermal behavior of water in a typical water heater unit over time. The rising curves indicate that the water heater is "on", and the falling curves represent the standby (or cooling down) periods, when the heater is in a "standby" state. As the water heater unit cycles, the water temperature in the tank rises and falls accordingly (shown in region 910). The upper and lower limits represent the so-called "dead-band" of the thermostat around the thermostat set-point. Because the asymptotic equilibrium temperatures are generally far lower than these limits for appropriately sized equipment, the exponential rising curve and falling curve are nearly linear between the upper limit and the lower limit. For completeness, region 912 of FIG. 9 also shows the asymptotic behavior of the water temperature if the water heater were allowed to cool below its lower limit.

Figure 10:
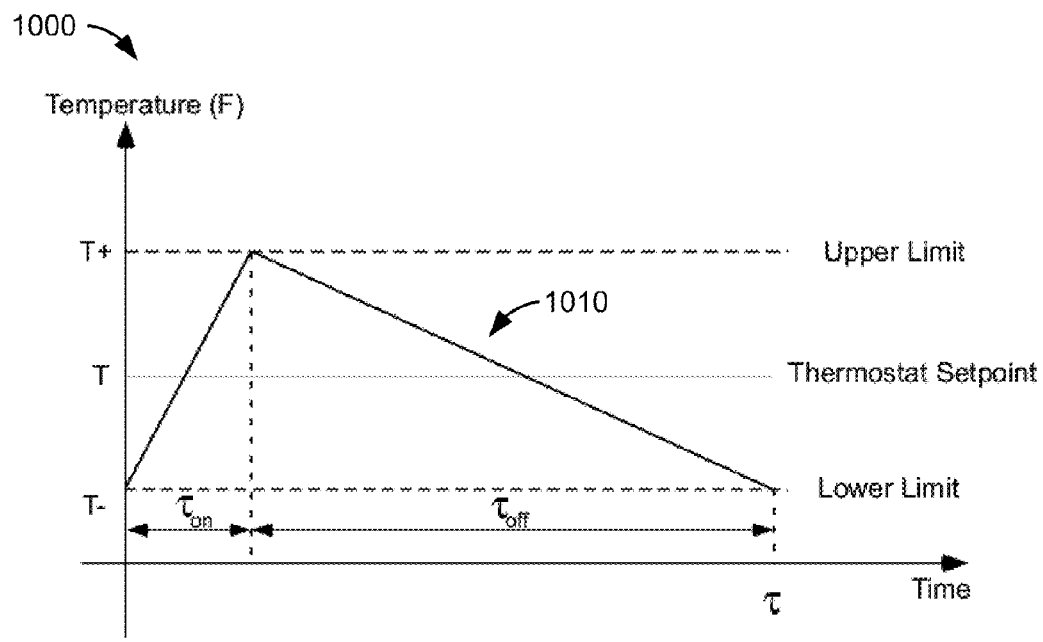
FIG. 10 is a graph illustrating a simplified representation of the behavior illustrated in FIG. 9.

To simplify the analysis of the thermal behavior of the hot water heater, a linear approximation 1010 of the thermal behavior observed in region 910 is shown in FIG. 10. In graph 1000 of FIG. 10, $T_+$ and $T_-$ are the upper and lower temperature limit for a given set-point T. The unit has a cycling time of $\tau$, with an "on" period of $\tau_{on}$ and an "off" period of $\tau_{off}$. It has been found that most heaters are operated due to the household's usage of water rather than due to heater losses. For example, a typical Norwegian residential water heater has a rated heating element capacity of 2 kW, and the heat loss from a tank is approximately 0.1 kWh/h at a temperature of 75° F. It takes approximately 2.3 hours for a fully heated tank to drop in temperature by 1° C. in standby mode. When a household uses hot water, cold water refills at the bottom of tank. The amount of energy needed to restore the energy used is:

$$q = mC\Delta T \quad (3)$$

where m is the mass of the added water in kg (or liters, since 1 liter of water≈1 kg), C is the specific heat of water, and $\Delta T$ is the amount in ° C. by which the temperature of the added water should be increased.

The time that the water heater needs to add this amount of energy is:

$$\Delta t_{on} = \frac{q}{60 P_e} \text{minutes} \quad (4)$$

where $P_e$ is the power rating of the water heater. This equation establishes a link between the required operation time of a water heater and the hot water usage of a household.

The pattern of the usage of hot water can vary from one household to another. The water usage can depend on, for example, the number of users, water consumption habits (e.g., the frequency of hot water use and the timing of the water consumption) and the facilities of a house (e.g., bath, shower, etc.). Water usage can be described by a probability density function. For example, it has been observed that a large share of water heater usage occurs in the morning hours between 7 a.m. and 9 a.m. and in the evening hours between 4 p.m. and 10 p.m.

3. Comfort Level

Different customers have different preferable temperature ranges of the water heater. The thermostat settings of water heaters typically vary from 120° F. to 160° F. The temperature of a water heater in a household is preferably raised above some threshold so that customers can use hot water in a comfortable way with the mixture of cold water. This preference significantly impacts the energy usage of a hot water in a household. A customer may choose to temporarily lower this temperature limit and make a sacrifice in comfort to reduce his energy bill. Nevertheless, there are certain times when customers are willing to pay whatever price is necessary to maintain the comfort level.

Figure 11:
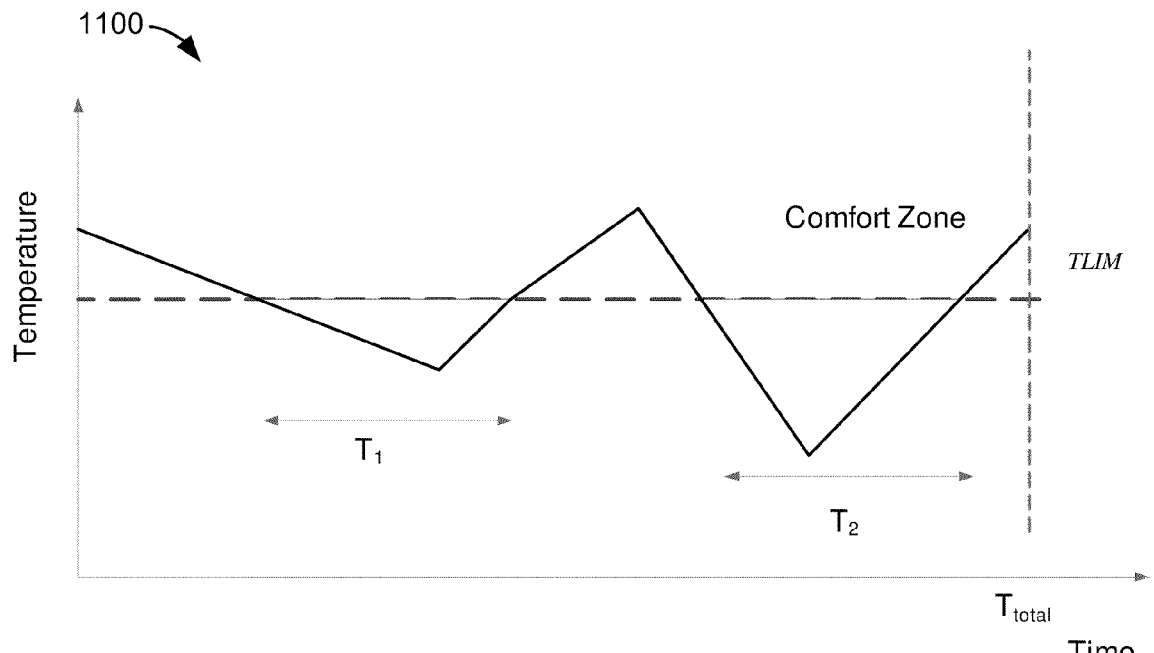
FIG. 11 is a graph illustrating periods in which a thermostatically controlled electronic device may operate below a user's comfort during certain time periods.

To track the comfort level of a hot water heater over a cycle (typically, a 24-hour day), a COMFORT index can be used. Graph 1100 in FIG. 11 illustrates a typical user's comfort tolerance through the course of a 24-hour day. As can be seen by the graph 1100 in FIG. 11, there are two time periods ($T_1$ and $T_2$) when the user is willing to allow the water temperature of the water heater to drop below a lower temperature limit $T_{LIM}$. The percentage of time when the temperature of the water heater is above the temperature limit $T_{LIM}$ can be defined as comfort level $C_{COMFORT}$:

$$C_{COMFORT} = \frac{T_{total} - T_b}{T_{total}} \quad (5)$$

where $T_b$ is the time duration when the temperature is below $T_{LIM}$ (in this case $T_b = T_1 + T_2$), and $T_{total}$ is the total operation cycle (in this case 24 hours). This implies that $C_{COMFORT}$ is constrained between 0 and 1.

4. Appliance Commitment

In some embodiments of the disclosed technology, the scheduling of an appliance is analyzed using the following objective function:

$$C_{op} = \min_{U_k}[\alpha \Sigma_{k=1}^{N}(P_k \times U_k) + \beta(1 - C_{COMFORT})] \quad (6)$$

where $C_{op}$ is the overall value of the objective function for the k time intervals, $P_k$ is the market price at the time interval k, $U_k$ is the energy usage in the time interval k, and $\alpha$ and $\beta$ are the weightings assigned to the different objective function components. The objective function is a combination of the energy payment component ($f_{cost} = \Sigma_{k=1}^{N}(P_k \times U_k)$) and comfort level component ($f_{comfort} = 1 - C_{COMFORT}$). The objective function in Equation (6) can be modified to incorporate other control objectives as well (either in addition to or instead the energy payment or comfort level components). For example, the control objective can be adapted to include components for any one or more of the following: providing ancillary services, responding to voltage and frequency signals, and following a predefined load shape. In certain implementations, a day-ahead schedule for an appliance is determined using the above formulation. Additionally, in particular implementations, real-time adjustments can be made to account for real-time variances in a user's preferred comfort level.

(a) Day-Ahead Scheduling

There is a similarity between the operation of a water heater and energy storage. The preheating period of a hot water heater is essentially an energy storage process, which is similar to the pumping mode of a pumped-storage power station, and the coasting period is similar to a water discharging mode of the pumped-storage power station. Therefore, bidding strategies, such as those described in N. Lu, J. H. Chow, and A. A. Desrochers, "Pumped-Storage Hydro-Turbine Bidding Strategies in a Competitive Electricity Market," *IEEE Trans. on Power Systems*, vol. 19, pp. 834-842 (May 2004), can be used with the disclosed load scheduling techniques in order to achieve preheating and coasting control over thermostatically controlled appliances.

To reduce the cost of operating the water heater (or other such thermostatically controlled appliance or non-thermostatically controlled appliance), a preheating period is desirably performed during lower price time periods, whereas the coasting periods are desirably performed during the peak-price periods or near-peak-price periods. Furthermore, and according to certain implementations, the water heater should be switched "on" immediately or shortly after use in order to restore the temperature after hot water is drawn from the tank and cold water is refilled. Otherwise, the delay will lead to prolonged uncomfortable periods.

(b) Real-Time Adjustment

The real-time market price typically deviates from the day-ahead forecasted price. Accordingly, and in some embodiments of the disclosed technology, the appliance commitment during a given interval or for an upcoming interval can be reevaluted in real-time (or at selected intervals during a day) using updated market-pricing information.

5. Exemplary Scheduling Methods

Figure 13:
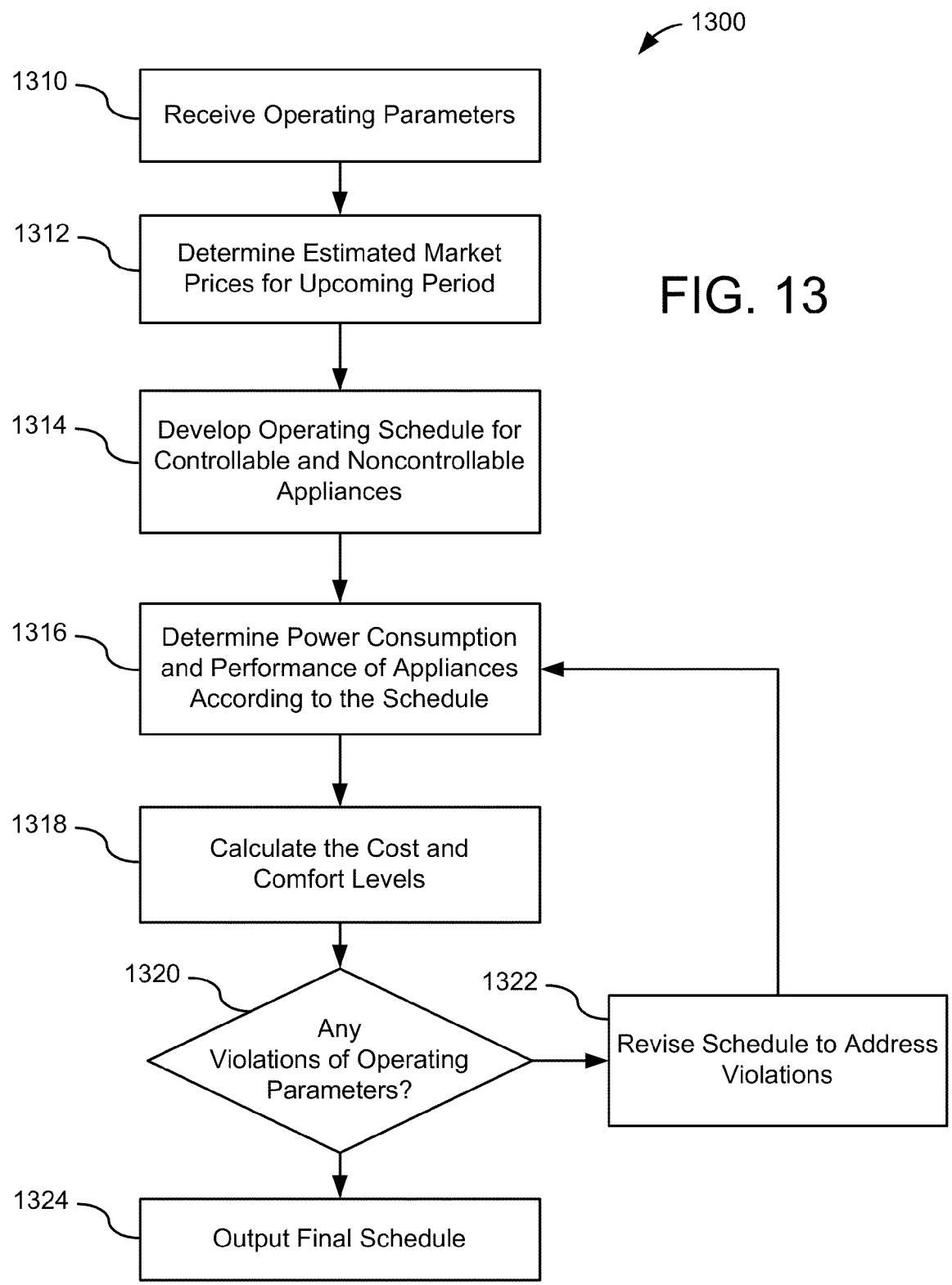
FIG. 13 is a flow chart showing an exemplary method for generating an operating schedule for controlling and modeling controllable electronic devices according to the disclosed technology.

FIG. 13 is a flowchart of an exemplary method 1300 for scheduling one or more appliances. The method 1300 can be used to perform day-ahead scheduling. Alternatively, aspects of the disclosed method can be used to update or create a schedule in real-time, or can be used to generate a schedule for any other time period in the future. In the illustrated embodiment, both controllable and noncontrollable appliances are scheduled. It should be understood, however, that the method can be used for just controllable appliances, or for just noncontrollable appliances. It should also be understood that other embodiments of the method shown in FIG. 13 can include additional or alternative method acts, or can omit certain ones of the illustrated method acts.

At process block 1310, operating parameters are received. For example, the operating parameters can be received from the user via a suitable graphic user interface (e.g., the graphic user interface of FIG. 7). The operating parameters can also be loaded (or buffered into memory) from a previously stored file that defines the operating parameters. The previously stored file can store the user-selected parameters or can store default parameters for the one or more electronic devices in the system. The operating parameters can include, for example, one or more of the user's estimated periods of operation for the appliances, the price limits for each appliance, and/or the performance preferences and limits for each appliance (e.g., the preferred hot water heater temperature along with the maximum temperature and the minimum temperature). This information can also be determined or updated using historical usage data. For instance, a usage history of the appliances can be generated over time (e.g., tracking temperature, times of operation, duration of each operation period, and the like) and used instead of or in addition to the data from the graphic user interface of FIG. 7.

Figure 12:
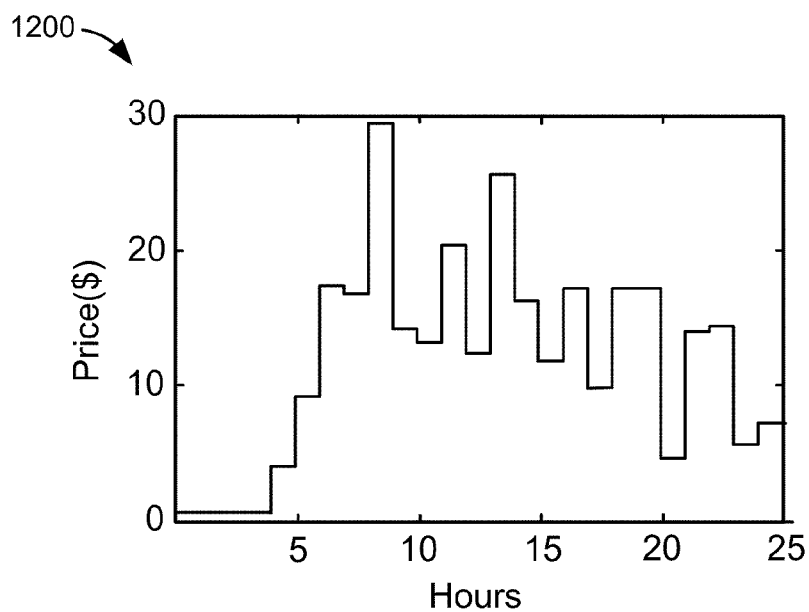
FIG. 12 is a graph illustrating example power market price information during a period of time.

At process block 1312, estimated market prices for an upcoming time period are determined. For example, in particular implementations, an estimated day-ahead market clearing price ("MCP") curve is determined. The market price can be forecast on an hourly basis or according to another suitable time interval. Forecast day-ahead prices can be computed using time-series models, weighted nearest neighbors techniques, autoregressive integrated moving average models ("ARIMA"), Mixed ARIMA methods, and/or Markov models. The estimated market prices can be determined using historical market price data that has been saved at the central controller or that is downloaded or otherwise retrieved from an external source (e.g., from a server operated by the utility). It has been generally observed that peak values usually occur from noon to 7:00 P.M., and valley hours usually occur from midnight to 6:00 A.M. The peaks and valleys can vary in magnitude and duration based on, for example, weather conditions, seasonal factors, holiday schedules, and the day of the week. FIG. 12 is a graph 1200 illustrating an example of estimated market prices for an upcoming day. As can be seen in the graph 1200, the highest price occurs at 7:00 A.M. and remains relatively high throughout the day, slowly declining until midnight, when the price drops.

At process block 1314, a schedule is developed for the controllable and noncontrollable devices. For the controllable devices, the schedule that is developed can target lower cost times for appliance operation and higher cost times for non-operational times. For example, the schedule can be developed by setting a price threshold above which the controllable appliances will be scheduled not to operate. The price threshold can initially be set at the lowest price of the estimated market prices, or can be set so that some percentage of the prices is lower than the price threshold, or to a fixed or user-defined price. Furthermore, in particular embodiments, preheating (or precooling) periods are used to take advantage of lower-cost time periods. Furthermore, for controllable devices that can be operated as both generators and loads (e.g., batteries of a PHEV), a schedule can be developed that draws power from the device during high-price periods and charges the device during low-price periods. For the noncontrollable devices, a schedule can also be developed. For example, the user's historical usage patterns for the noncontrollable devices can be used to develop the schedule. In particular implementations, the schedule for the noncontrollable devices assumes that the user will use the noncontrollable device as they have historically, and thus will schedule those devices as "on" during the corresponding periods. The historical usage data can be obtained by monitoring the status of the devices, or by monitoring the overall power usage in the household and accounting for the known power usage that is attributable to controllable devices. In particular implementations, the schedule of use for the noncontrollable device includes randomly selected time periods (e.g., the periods of use are randomized but cumulatively equal the daily historical power usage for noncontrollable devices). Alternatively, the periods of use for the noncontrollable devices are based on statistics or probabilities. In other embodiments, the user can edit or otherwise generate the schedule for the noncontrollable devices. For instance, the user can input the operating times for the noncontrollable devices using a graphic user interface (such as the graphic user interface in FIG. 7).

At process block 1316, the power consumption of appliances operating according to the schedule is determined. For example, simulations can be performed using models of the appliances (models such as the model introduced above for the hot water heater) operating according to the schedule determined in process block 1314. In particular implementations, one or more of the models described in S. Katipamula and N. Lu, "Evaluation of Residential HVAC Control Strategies for Demand Response Programs," *ASHRAE Transactions*, Volume 112, Part 1 (2006) and R. T. Guttromson, D. P Chassin, and S. E Widergreen, "Residential Energy Resource Models for Distribution Feeder Simulation," *Proc.* 2003 *IEEE Power Engineering Society General Meeting* (July 2003) or simplified versions thereof are used. In certain embodiments, the modeling is performed using power rating information that is supplied by the user (e.g., through a user interface, such as the user interface shown in FIG. 7).

At process block 1318, the cost and comfort levels are computed from the results of the determination at process block 1316. For example, a total payment C can be computed for the developed schedule using the power output resulting from the scheduled operation. In particular, and according to certain implementations, a total payment C for an appliance can be computed according to the following:

$$C = \sum_{i=1}^{N} P_k(i) U_k(i) \tag{7}$$

The total payment for each appliance can then be summed to arrive an overall power usage figure. Furthermore, the cost computation can take into account the availability of power from distributed generators in the system (e.g., power supplied by PHEV batteries 222 or power generation system 256). In some implementations, the comfort levels are computed according to Equation (5) above or other such equation. Power usage and comfort level can also be computed for discrete periods during the day (e.g., morning, afternoon, and night) depending on the implementation. In certain embodiments, an objective function (such as the objective function in Equation (6)) is computed to determine a single value that represents the degree to which the schedule achieves the user's desired objectives.

At process block 1320, the schedule is evaluated to determine whether there are any violations of the operating parameters exist. For example, according to certain embodiments, the simulation results from process block 1314 are analyzed and evaluated for any violations. For instance, the simulation results could show that according to the current schedule, the temperature of the hot water heater would exceed the user-selected maximum temperature during one of the periods of operation identified by the user (e.g., as determined from the operating input by the user via a graphic user interface, such as graphic user interface 700 in FIG. 7). Similarly, the simulation results could show that the temperature controlled by an air conditioner exceeds the user-selected maximums during certain periods. If any violations are detected, then a revised schedule is generated at process block 1322; otherwise, the process ends at process block 1324 by outputting the final schedule (e.g., storing or displaying the final schedule). The final schedule can then be accessed by the central controller during the following day (or other relevant time period) and used to determine the appropriate control signals for the controllable appliances. In certain embodiments, the final schedule along with the projected cost and comfort level can be displayed to the user, who may then elect to alter the schedule or the operational parameters in order to reduce the cost or otherwise adjust the cost or comfort level.

At process block 1322, a revised schedule is developed based on the violations of the operating parameters detected at process block 1320. For example, the operating schedule can be incrementally adjusted to alleviate the one or more violations. For instance, if the simulation results showed that the temperature of the hot water heater exceeded the user-selected maximum temperature during one of the periods of operation identified by the user, then the schedule can be adjusted so that the hot water heater turns off 15 minutes earlier (or some other interval) in advance of the period of operation identified by the user. Similarly, if the simulation results showed that the temperature controlled by an air conditioner exceeded the user-selected maximum during a certain period, then the schedule can be adjusted so that the air conditioner operates for 15 minutes (or some other interval) in advance of or during the period of operation identified by the user. These adjustments can be made regardless of the market price. Alternatively, the adjustments can be made so long as the market price does not exceed the maximum market price (e.g., the user-selected maximum market price).

Once the revised schedule is determined, the revised schedule can be resimulated at process block 1316. Process blocks 1316, 1318, 1320 and 1322 can be repeated as necessary until a schedule is generated that does not violate any of the operating parameters. Alternatively, process blocks 1316, 1318, 1320, and 1322 can be repeated for a fixed number of iterations or until some other criteria is reached. Because the exemplary approach described above initially begins with the lowest-cost schedule and incremental adjusts from there, the final schedule will typically be the lowest-cost schedule that satisfies the desired operating parameters. Furthermore, in particular embodiments, only the schedule for an appliance that violates the operating parameters is rescheduled at process block 1322. In other words, the entire schedule need not be reevaluated at process blocks 1316, 1318, or 1320.

Figure 21:
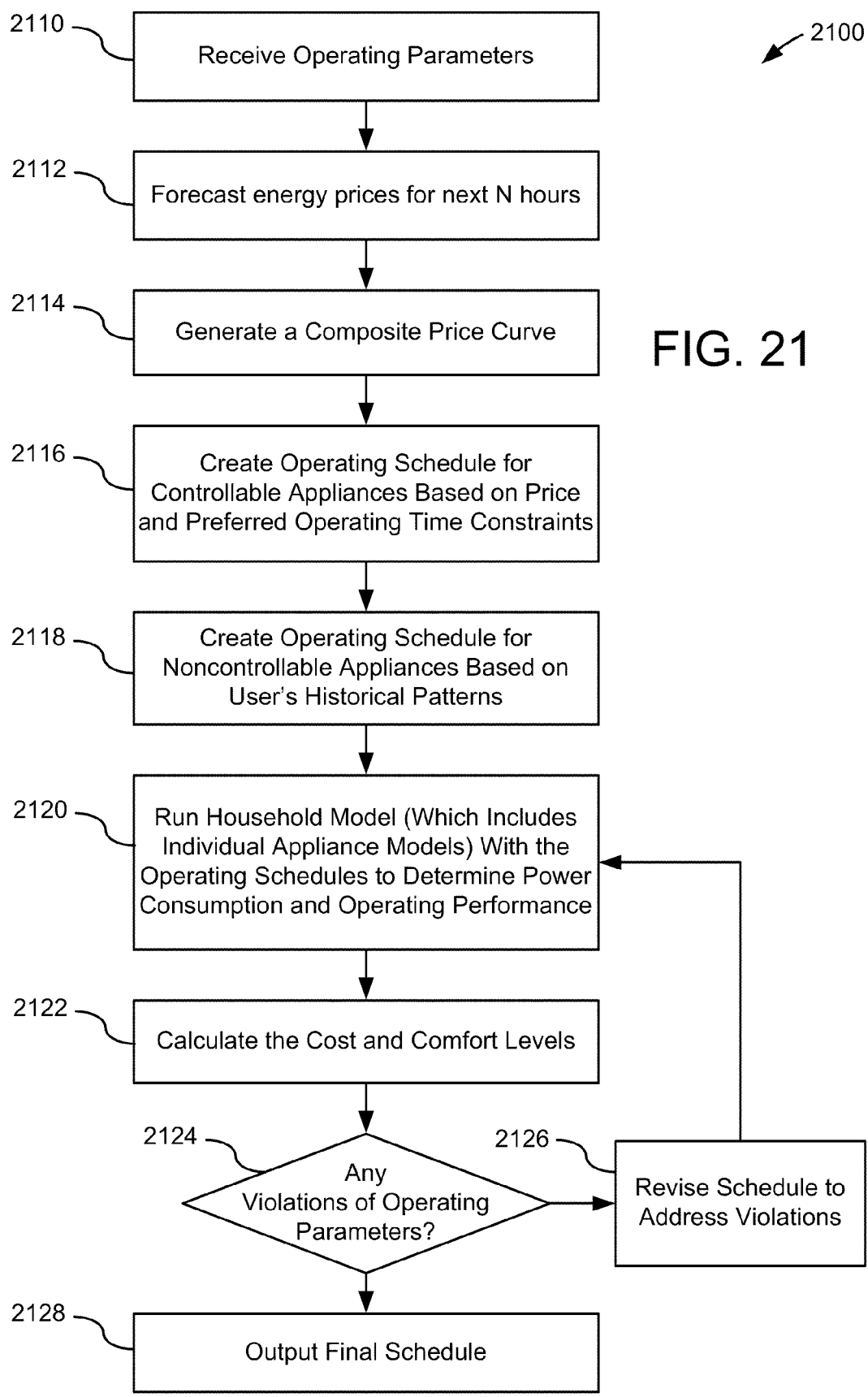
FIG. 21 is a flow chart illustrating another exemplary method for generating an operating schedule for controlling and modeling controllable electronic devices according to the disclosed technology.

FIG. 21 is a flowchart of another exemplary method 2100 for scheduling one or more appliances. The exemplary method 2100 represents a particular implementation of the method 1300 shown in FIG. 13. It should be understood that other embodiments of the method shown in FIG. 21 can include additional or alternative method acts, or can omit certain ones of the illustrated method acts.

At process block 2110, operating parameters are received. Any of the methods described above with respect to process block 1310 can be used to receive the operating parameters.

At process block 2112, energy prices for the next N hours are forecast. Any of the methods described above with respect to process block 1310 can be used to obtain this information.

At process block 2114, a composite price curve is generated. For example, in certain embodiments, the composite price curve can be generated by sorting the energy prices from process block 2112 from lowest to highest while keeping track of the hour of the day associated with each price.

At process block 2116, an operating schedule for the controllable appliances is created. Any of the methods described above with respect to process block 1314 can be used to generate the schedule. For example, in particular implementations, the schedule can be developed based on the price information determined at process block 2112 and the preferred operating constraints received at process block 2110.

At process block 2118, an operating schedule for the noncontrollable appliances is created. Any of the methods described above with respect to process block 1314 can be used to generate the schedule. For example, in particular implementations, the user's historical patterns can be used to determine the operating schedule for noncontrollable appliances. In some implementations, suggestions for alternative schedules based on the estimated energy costs can be displayed to the user (e.g., via a graphic user interface). The user can then accept, reject, edit, or otherwise modify the schedule created for the noncontrollable devices.

At process block 2120, a household model can be run in accordance with the created schedules in order to determine the anticipated power consumption and operating performance. The household model can comprise, for example, the individual appliance models that are used to model the performance of each of the controllable and noncontrollable devices in the household and included in the schedule. Any of the methods described above with respect to process block 1316 can be used to generate the model.

At process block 2122, the cost and comfort levels are computed. Any of the methods described above with respect to process block 1318 can be used to compute one or more of these levels.

At process blocks 2124 and 2126, the schedules are revised if there are violations of the operating parameters. Otherwise, the current schedule is output as the final schedule at process block 2128. Any of the methods described above with respect to process blocks 1320 and 1322 can be used to check for violations and to revise the schedule.

6. Evaluation of Control Strategies

To evaluate and illustrate various control strategies that can be selected using embodiments of the disclosed technology, the exemplary price data of FIG. 12 was used and applied to the estimated usage of a hot water heater. The usage schedule used in this evaluation assumes that the major hot water usage occurred at 7 A.M. and again at 4 P.M. (hour 16 in the graph 1200).

Figure 14:
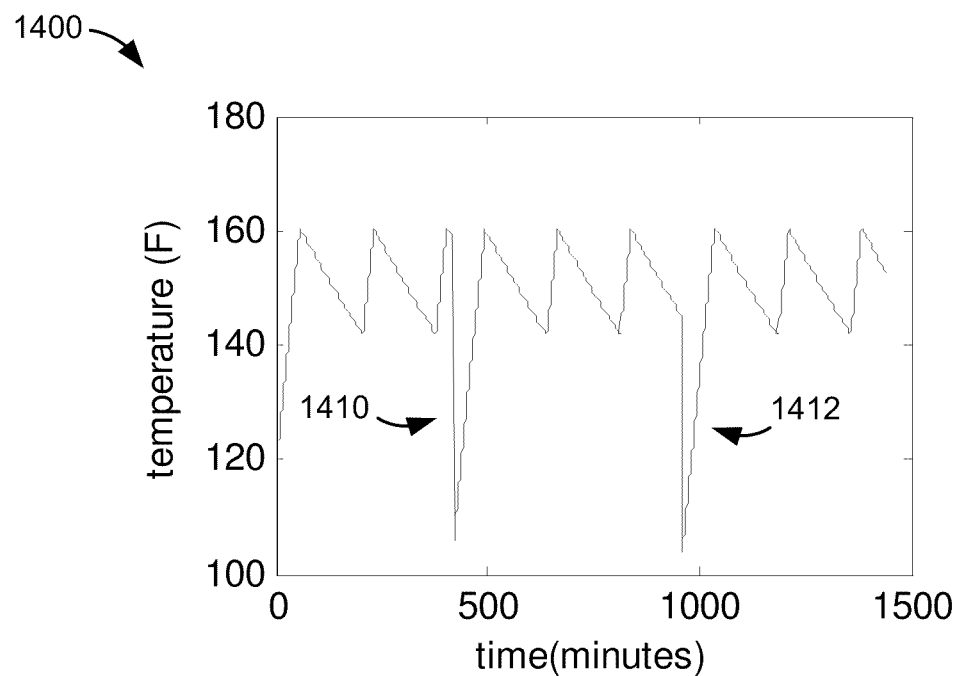
FIG. 14 is a first graph illustrating temperature behavior of a thermostatically controlled electronic device set at a high comfort setting for the whole day.

FIG. 14 is a graph 1400 showing the temperature of the hot water heater when it operates in its normal, uncontrolled, manner. In particular, the hot water heater maintains the water temperature between the low limit and the high limit by turning on whenever the temperature falls below the lower limit. The two high-usage periods are visible at 1410 and 1412 and represent the periods when the temperature of the hot water drops to near room temperature after the users in the household use all of the hot water. Shortly after the hot water usage, the hot water is heated until the temperature reaches the upper limit of the dead-band. As can be seen, except for the periods 1410, 1412, the temperature remains between the low limit and the high limit throughout the day, even in periods of non-use and in periods of high price. The normalized energy cost for the control strategy illustrated in FIG. 14 is "424."

Figure 15:
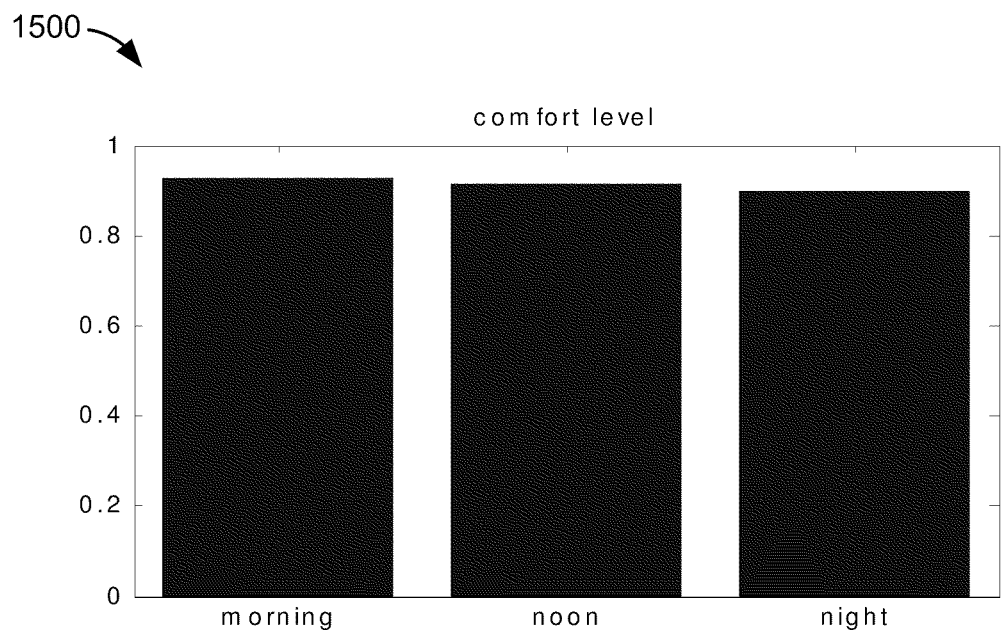
FIG. 15 is a first graph illustrating the comfort level achieved by the thermostatically controlled electronic device set at a high comfort setting for the whole day.

FIG. 15 is a graph 1500 illustrating the comfort level value ($C_{COMFORT}$ from Equation (5) above) for the three main time usage time periods: morning, noon, and night. As can be seen, the comfort level values remain constant and relatively high (between 0.9 and 1) throughout each of the main time usage periods.

Figure 16:
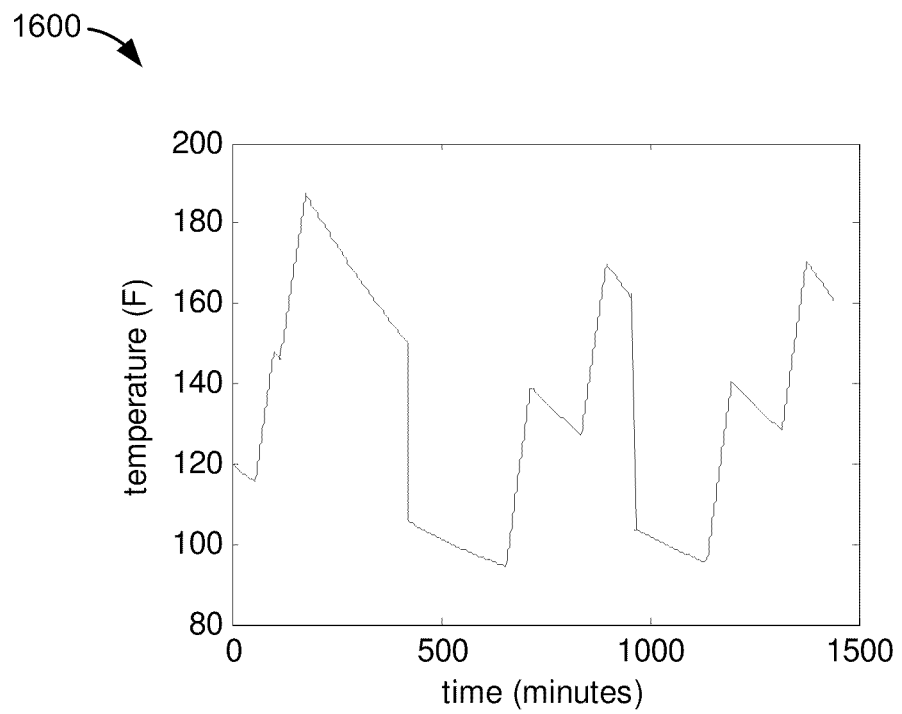
FIG. 16 is a second graph illustrating temperature behavior of a thermostatically controlled electronic device with a high comfort setting in the morning.

To reduce the energy cost, an improved schedule of operation can be determined. If the customer comfort level is not considered, a schedule can be determined in which the water heater is operated during periods when the price is lowest. FIG. 16 is a graph 1600 showing the temperature of the hot water heater when it operates using the schedule determined when customer comfort level is not considered. As can be seen in FIG. 16, the schedule determined includes roughly three time intervals (in the morning hours, the afternoon hours, and the evening hours) in which the hot water heater is activated. However, because the heating of the hot water is postponed until the period of lowest price in the afternoon and evening, a prolonged period of low temperature is experienced by the users in the household, which can cause a significant inconvenience for the users (or high un-comfort level). The normalized energy cost for the control strategy illustrated in FIG. 14 is 138.

Figure 17:
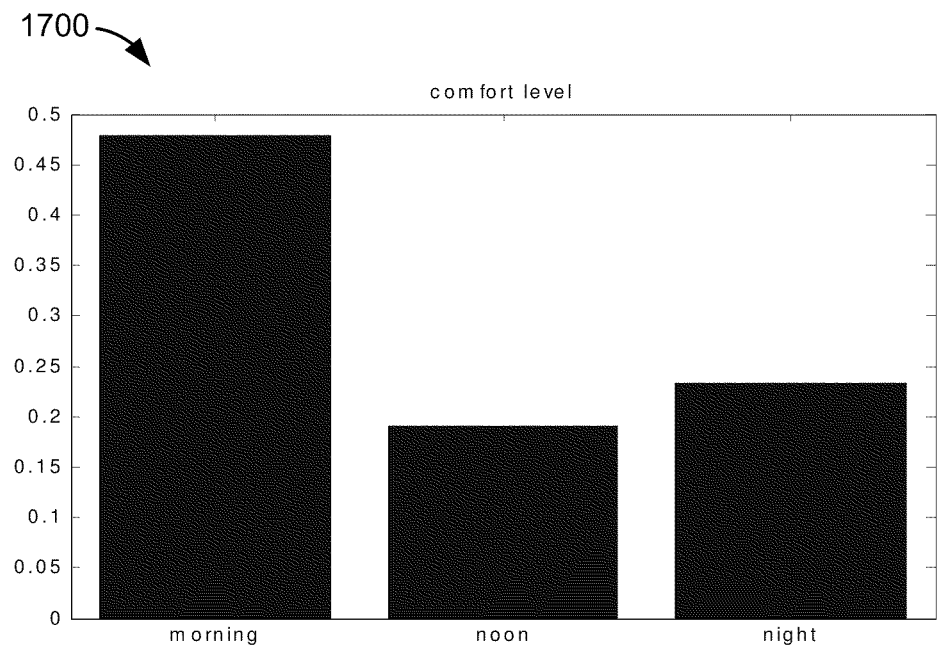
FIG. 17 is a second graph illustrating the comfort level achieved by the thermostatically controlled electronic device with a high comfort setting in the morning.

FIG. 17 is a graph 1700 illustrating the comfort level value ($C_{COMFORT}$ from Equation (5) above) for the three main time usage time periods when the customer comfort level is not considered. As can be seen, the comfort level values drop significantly during the afternoon and night time periods and all comfort levels are below 0.5.

Figure 18:
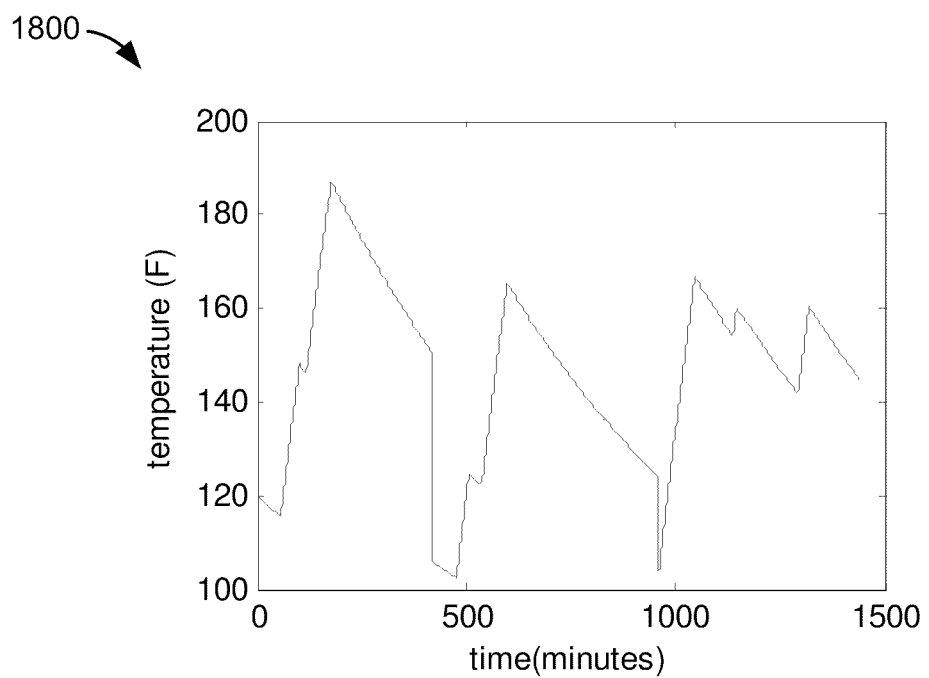
FIG. 18 is a third graph illustrating temperature behavior of a thermostatically controlled electronic device with a high comfort setting at night.

FIG. 18 is a graph 1800 showing the temperature of the hot water heater when it operates using a schedule determined when customer comfort level is considered. As can be seen, the hot water temperature is maintained at much high levels than in graph 1600 but still involves fewer periods of heating than in graph 1400. The normalized energy cost for the control strategy illustrated in FIG. 14 is 183.

Figure 19:
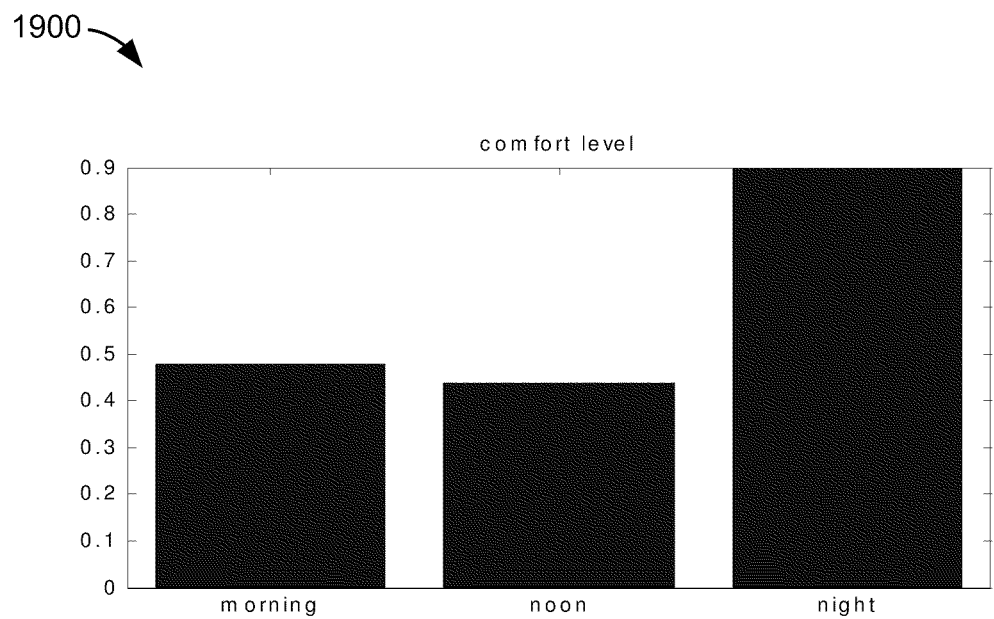
FIG. 19 is a third graph illustrating the comfort level achieved by the thermostatically controlled electronic device with a high comfort setting at night.

FIG. 19 is a graph 1900 illustrating the comfort level value ($C_{COMFORT}$ from Equation (5) above) for the three main time usage time periods when the customer comfort level is considered. As can be seen, the comfort level is between 0.4 and 0.5 for the morning and noon periods and is at 0.9 for the night period. These comfort values represent a significant improvement from the levels shown in graph 1700, even though the difference in energy cost is modest.

7. Example of Reducing the Optimization Operation for a Given Interval

Figure 20:
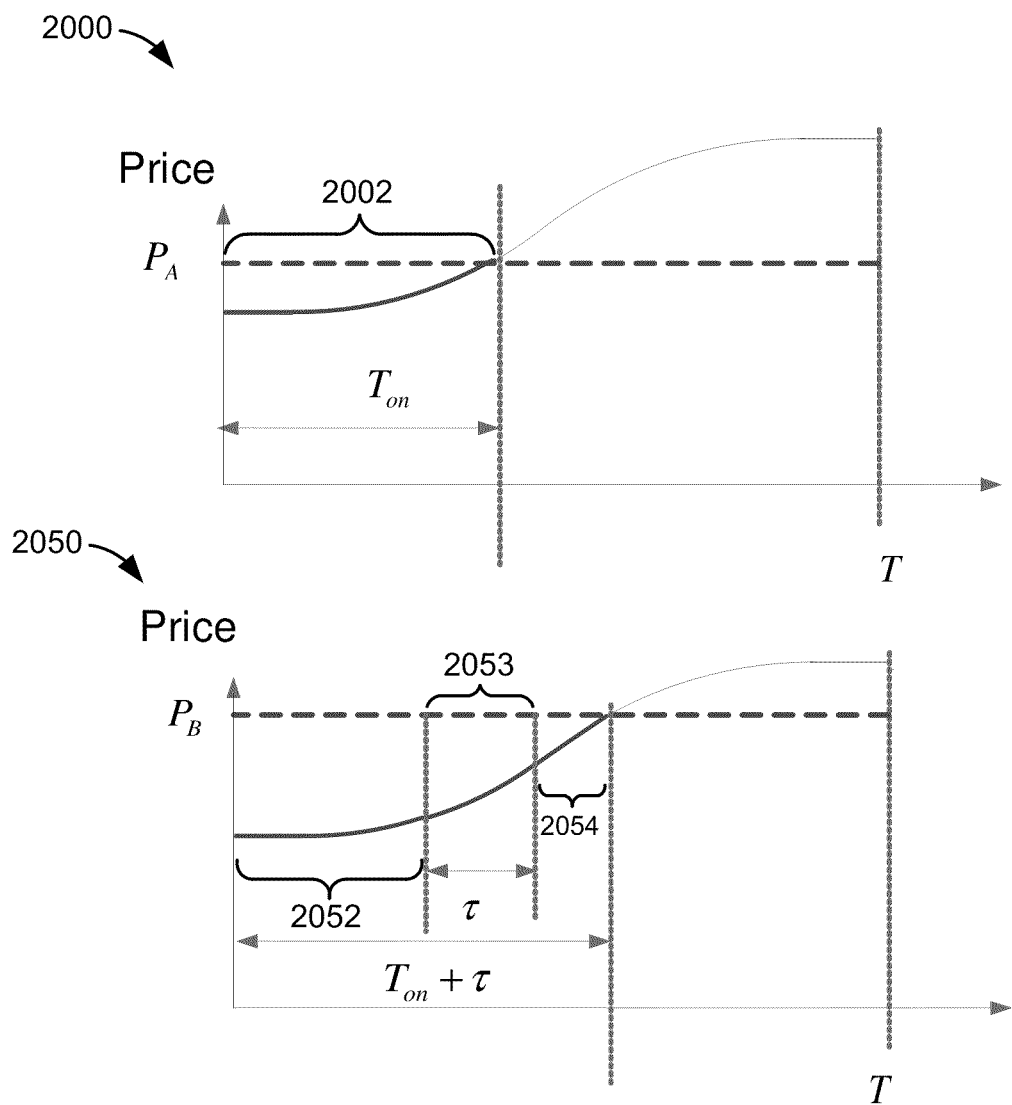
FIG. 20 is a graph illustrating the effect of the high comfort setting on the appliance operating schedule.

This section illustrates how user comfort settings can affect schedule determination (e.g., when schedules are evaluated using Equation (6)). As noted, when no consideration is given to a user's comfort level, a water heater can be scheduled to turn on in the periods of lowest price and turned off in the periods of highest price to save cost. For example, consider the forecast prices shown in FIG. 12. The forecasted price can be sorted in order of magnitude as shown in FIG. 20. When sorted in this fashion, the operation cycle T (representing, for example, 24 hours) is formed with prices rising from lowest to highest. A price threshold can be designated as $P_A$ in Graph 2000. For purposes of this example, any period (e.g., any 15 minute period) when the market price is lower than $P_A$ can be considered as a low price period (when the water heater is turned on), and any period when the market price is higher than $P_A$ can be considered as a higher price period (when the water heater is turned off). Therefore, the schedule of a water heater can be determined in each time interval based on the forecasted price signal.

Graph 2000 shown in FIG. 20 illustrates a scenario in which the water heater is switched "on" only in the low price period 2002 (also shown as period $T_{on}$). This yields the minimum operation cost for a water heater. However, one consequence is that turning on the water heater has to be delayed until the time interval when the price is low. Before this happens, the water heater is not heated and its water temperature is low, leading to sacrificed comfort level in exchange for more economical benefit.

Graph 2050 shown in FIG. 20 illustrates a scenario in which there exists a higher price threshold $P_B$. In this situation, a hot water heater is switched "on" during period 2052 and 2054, but can be switched "off" during period 2053 (also shown as period τ). This results in an "off" period during the low price period, as shown by period τ in graph 2050. In this situation, the water heater may be switched "on" again at a higher price period (period 2054 in graph 2020) compared to the scenario in graph 2000. For graph 2050, however, the value of $C_{COMFORT}$ should be higher because the amount of time the hot water will be above the low-temperature limit will likely be higher than in graph 2000.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A method, comprising:
receiving data from a user concerning a power price limit below which the user prefers to have a controllable electronic device operate;

determining estimated market prices of power for an upcoming period of time, the upcoming period of time including different estimated market prices of power at different time intervals within the upcoming period of time, including a peak power price time interval and a lower power price time interval during which the estimated market price of power is less than during the peak power price time interval;

determining estimated operating times for the controllable electronic device throughout the upcoming period of time;

using computing hardware, generating a schedule for operating the controllable electronic device during the upcoming period of time based at least in part on the estimated operating times for the controllable electronic device, the schedule for operating the controllable electronic device including a scheduled operating time for the controllable electronic device occurring at least partially during the lower power price time interval;

determining a current market price for power during the scheduled operating time;

determining information indicative of whether the current market price for power exceeds the power price limit;

transmitting the information to an information display for the controllable electronic device; and displaying the information to the user at the information display for the controllable electronic device.

2. The method of claim 1, further comprising generating control signals for operating the controllable electronic device according to the schedule.

3. The method of claim 2, further comprising transmitting the control signals to the controllable electronic device.

4. The method of claim 1, wherein the determining the estimated operating times for the controllable electronic device comprises receiving data from a user indicating desired operational times for the controllable electronic device during the upcoming period of time.

5. The method of claim 1, wherein the data are for a thermostatically-controlled device and further include one or more of a low temperature limit, a high temperature limit, and a preferred temperature.

6. The method of claim 1, wherein the generating the schedule comprises:
generating a candidate schedule for the controllable electronic device that schedules operation of the controllable electronic device during intervals of the upcoming period of time in which the estimated market price is lower than in other intervals of the upcoming period of time;
modeling performance of the controllable electronic device according to the generated schedule; and
evaluating the modeled performance of the controllable electronic device to determine whether the modeled performance violates any of the performance values during the estimated operating times.

7. The method of claim 6, wherein the generating the schedule further comprises revising the candidate schedule based on the evaluation.

8. The method of claim 1, wherein the upcoming period of time is an upcoming day.

9. The method of claim 1, wherein the controllable electronic device is a thermostatically controlled electronic device or a non-thermostatically controlled electronic device.

10. The method of claim 1, wherein the generating the schedule comprises computing a value indicative of the cost of operating the controllable electronic device according to the schedule and a value indicative of a user comfort level obtained when the controllable electronic device is operated according to the schedule.

11. The method of claim 1, further comprising:
determining estimated operating times for a non-controllable electronic device based on data indicating a historical usage of the non-controllable electronic device; and
using the computing hardware, generating a schedule for operating the non-controllable electronic device during the upcoming period of time based at least in part on the estimated operating times for the non-controllable electronic device.

12. The method of claim 11, further comprising:
monitoring power usage in a household power network; and
computing the data indicating the historical usage of the non-controllable electronic device from the monitored power usage.

13. The method of claim 1, wherein the power price limit is a high power price limit, wherein the receiving further comprises receiving from the user a medium power price limit and a low power price limit, and wherein the displaying the information to the user further comprises displaying information indicative of which of the following available categories the current market price for power belongs in: (a) below the low power price limit, (b) between the low power price limit and the medium power price limit, (c) between the medium power price limit and the high power price limit, or (d) above the high power price limit.

14. A method, comprising:
determining estimated market prices of power for an upcoming period of time, the upcoming period of time including different estimated market prices of power at different time intervals within the upcoming period of time, including a peak power price time interval and a lower power price time interval during which the estimated market price of power is less than during the peak power price time interval;
using computing hardware, generating a schedule for operating a non-controllable electronic device throughout the upcoming period of time, the schedule including randomly selected time periods of operation that cumulatively correspond to a historical usage of the non-controllable electronic device, the randomly selected time periods occurring at least partially during the peak power price time interval or the lower power price time interval; and
using the computing hardware, calculating a cost of operating the non-controllable electronic device according to the schedule.

15. The method of claim 14, further comprising:
monitoring power usage in a household power network; and
computing the data indicating the historical usage of the non-controllable electronic device from the monitored power usage.

16. A controller for controlling operational states of one or more household devices, the controller comprising computing hardware configured to:
receive data from a user indicating respective power price limits for each individual controllable electronic device in a group of two or more controllable electronic devices, the respective power price limit for one of the controllable electronic devices indicating a price for power above which the user desires to have the controllable electronic device deactivated;

determine estimated market prices of power for an upcoming period of time, the upcoming period of time including different estimated market prices of power at different time intervals within the upcoming period of time, including a peak power price time interval and a lower power price time interval during which the estimated market price of power is less than during the peak power price time interval;

determine respective estimated operating times for the controllable electronic devices in the group during the upcoming period of time; and generate respective schedules for operating the controllable electronic devices in the group during the upcoming period of time based at least in part on the received power price limits and the estimated operating times for the controllable electronic devices in the group, the schedules for operating the controllable electronic devices including scheduled operating times for the controllable electronic devices occurring at least partially during the lower power price time interval.

17. The controller of claim 16, wherein the computing hardware comprises a computer processor and memory.

18. The controller of claim 16, wherein the computing hardware comprises an application specific integrated circuit or programmable logic device.

19. The controller of claim 16, wherein the computing hardware is further configured to generate control signals for operating the controllable electronic devices according to the respective schedules.

20. The controller of claim 19, further comprising one or more transceivers, the computing hardware being further configured to cause transmission of the control signals to the controllable electronic devices via the one or more transceivers.

21. The controller of claim 16, wherein the computing hardware is further configured to:
receive data from the user indicating respective desired operational times for each individual controllable electronic device in the group of two or more controllable electronic devices during the upcoming period of time; and
determine the estimated operating times for the controllable electronic devices based at least in part on the received data.

22. The controller of claim 16, wherein the computing hardware is further configured to:
receive data from the user indicating respective desired performance values for each individual controllable electronic device in the group of two or more controllable electronic devices during the upcoming period of time.

23. The controller of claim 22, wherein the computing hardware is further configured to generate the schedule by:
modeling performance of the controllable electronic devices according to the respective schedules; and
evaluating the modeled performance of the controllable electronic devices to determine whether the modeled performance violates any of the performance values during the estimated operating times.

24. The controller of claim 23, wherein the computing hardware is further configured to generate revised schedules by revising the schedules based on the evaluation.

25. The controller of claim 16, wherein the computing hardware is configured to generate the respective schedules by computing respective values indicative of the cost of operating the respective controllable electronic devices according to the schedules and values indicative of a user comfort level obtained when the controllable electronic devices are operated according to the respective schedules.

26. The controller of claim 16, wherein the computing hardware is further configured to:
determine estimated operating times for a non-controllable electronic device based on data indicating a historical usage of the non-controllable electronic device; and
generate a schedule for operating the non-controllable electronic device during the upcoming period of time based at least in part on the estimated operating times for the non-controllable electronic device.

27. The controller of claim 26, wherein the computing hardware is further configured to monitor power usage in a household power network and compute the data indicating the historical usage of the non-controllable electronic device from the monitored power usage.

28. A method, comprising:
via a graphic user interface, allowing a user to input data indicating device-specific operational parameters for each individual household device in a group of two or more household devices;
determining estimated market prices of power for an upcoming time period, the upcoming period of time including different estimated market prices of power at different time intervals within the upcoming period of time, including a peak power price time interval and a lower power price time interval during which the estimated market price of power is less than during the peak power price time interval;
generating respective schedules indicating time intervals during which each of the respective household devices is operational and time intervals during which each of the respective household devices is not operational for the upcoming time period, the household devices being thermostatically controlled household devices and the schedules including time intervals of precooling or preheating for the respective household devices occurring at least partially during the lower power price time interval;
using computing hardware, computing a cost for operating the household devices according to the schedules; and
using the computing hardware, computing a comfort level of a user when the household devices are operated according to the schedules.

29. The method of claim 28, wherein the schedules are first schedules, the method further comprising:
generating second schedules indicating time intervals during which the respective household devices are operational and time intervals during which the respective household devices are not operational, at least one of the time intervals during which the respective household devices are operational in the second schedules being different from the first schedules;
using the computing hardware, computing a cost for operating the respective household devices according to the second schedules; and
using the computing hardware, computing a comfort level of a user when the respective household devices are operated according to the second schedules.

30. The method of claim 29, wherein the generating the second schedules comprises:
modeling performance of the respective household devices when the household devices are operated according to the respective first schedules;
evaluating the performance of the respective household devices according to the first schedules relative to desired one or more operating times and one or more desired performance limits of the respective household devices; and modifying the first schedules to address violations in the desired operating times and the desired performance limits of the respective household devices detected as a result of the evaluation.

31. The method of claim 28, wherein:
the data concerning operational parameters for the respective household devices include one or more time intervals during which the user prefers to have the respective household devices operational; and
generating the schedules is based at least in part on the one or more time intervals.

32. The method of claim 31, wherein the computing hardware is further configured to receive data from the user indicative of respective performance limits for each individual household device in the group of two or more household devices, the respective performance limit for one of the household devices indicating a performance limit within which the user prefers to have the household device operate.

33. The method of claim 28, wherein the operational parameters include a lower temperature limit, a higher temperature limit, and a preferred temperature.

34. A controller for controlling operational states of one or more household devices, the controller comprising computing hardware configured to:
receive data from a user indicating device-specific operational parameters for each individual household device in a group of two or more household devices;
determine estimated market prices of power for an upcoming period of time, the upcoming period of time including different estimated market prices of power at different time intervals within the upcoming period of time, including a peak power price time interval and a lower power price time interval during which the estimated market price of power is less than during the peak power price time interval;
generate respective schedules for each of the household devices for the upcoming period of time, the schedules indicating time intervals during which the respective household devices are operational and time intervals during which the respective household devices are not operational, the household devices being thermostatically controlled household devices and the schedules including time intervals of precooling or preheating occurring at least partially during the lower power price time interval;
compute a cost for operating the household devices according to the schedules; and
compute a comfort level of a user when the household devices are operated according to the schedules.

35. The controller of claim 34, wherein the computing hardware comprises a computer processor and memory.

36. The controller of claim 34, wherein the computing hardware comprises an application specific integrated circuit or programmable logic device.

37. The controller of claim 34, wherein the schedules are first schedules, the computing hardware being further configured to:
generate second schedules indicating time intervals during which the household devices are operational and time intervals during which the household devices are not operational, at least one of the time intervals during which at least one of the household devices is operational in the second schedules being different from the first schedules;
compute a cost for operating the household devices according to the second schedules; and
compute a comfort level of a user when the household devices are operated according to the second schedules.

38. The controller of claim 37, wherein the computing hardware generates the second schedules by:
modeling performance of the household devices when the household devices are operated according to the first schedules;
evaluating the performance of the household devices according to the first schedules relative to desired one or more operating times and one or more desired performance limits of the household devices; and
modifying the first schedules to address violations in the desired operating times and the desired performance limits of the household devices detected as a result of the evaluation.

39. The controller of claim 34, wherein:
the controller further comprises a graphic user interface configured to receive the operational data concerning the household devices from the user; and
the computing hardware is further configured to generate the schedule based at least in part on the operational data concerning the household devices received from the user via the graphic user interface.

40. The controller of claim 39, wherein the data concerning operational parameters of the household devices received from the user identify one or more of the time intervals during which the user prefers to have the household devices operational.

41. The controller of claim 39, wherein the device-specific operational parameters further comprise one or more performance limits for each individual household device in the group of two or more household devices, a respective performance limit for one of the household devices indicating a performance limit within which the user prefers to have the household device operate.

42. The controller of claim 34, wherein the operational parameters include a lower temperature limit, a higher temperature limit, and a preferred temperature.

43. One or more non-transitory computer-readable media storing computer-executable instructions for causing a computer to perform a method, the method comprising:
providing a graphic user interface that displays a device-level list of one or more controllable electronic devices to a user, the controllable electronic devices in the list being powered by a power network;
determining estimated market prices of power for an upcoming period of time, the upcoming period of time including different estimated market prices of power at different time intervals within the upcoming period of time, including a peak power price time interval and a lower power price time interval during which the estimated market price of power is less than during the peak power price time interval; and
via the graphic user interface, allowing a user to input data indicating device-specific operational parameters for each of the one or more controllable electronic devices in the list,
the operational parameters including one or more time intervals within the upcoming period of time during which a selected one of the one or more controllable electronic devices is to be activated, at least one of the one or more time intervals occurring at least partially during the lower power price time interval,
the operational parameters further including a price limit for the selected one of the one or more controllable electronic devices indicating a price at which the selected one of the one or more controllable electronic devices is to be deactivated if exceeded by a current market price for power;

wherein the method further comprises generating a schedule for operating the one or more controllable electronic devices during the one or more time intervals based at least in part on the data concerning the device-specific operational parameters; and wherein the method further comprises generating a schedule for one or more noncontrollable electronic devices based on historical usage patterns of the noncontrollable electronic devices.

44. One or more non-transitory computer-readable media storing computer-executable instructions for causing a computer to perform a method, the method comprising:

receiving data from a user concerning a power price limit below which the user prefers to have a controllable electronic device operate;

determining estimated market prices of power for an upcoming period of time, the upcoming period of time including different estimated market prices of power at different time intervals within the upcoming period of time, including a peak power price time interval and a lower power price time interval during which the estimated market price of power is less than during the peak power price time interval;

determining estimated operating times for the controllable electronic device throughout the upcoming period of time;

generating a schedule for operating the controllable electronic device during the upcoming period of time based at least in part on the estimated operating times for the controllable electronic device, the schedule for operating the controllable electronic device including a scheduled operating time for the controllable electronic device occurring at least partially during the lower power price time interval;

determining a current market price for power during the scheduled operating time;

determining information indicative of whether the current market price for power exceeds the power price limit;

transmitting the information to an information display for the controllable electronic device; and displaying the information to the user at the information display for the controllable electronic device.

45. The one or more non-transitory computer-readable media of claim 44, wherein the method further comprises generating control signals for operating the controllable electronic device according to the schedule.

46. The one or more non-transitory computer-readable media of claim 45, wherein the method further comprises transmitting the control signals to the controllable electronic device.

47. The one or more non-transitory computer-readable media of claim 44, wherein the determining the estimated operating times for the controllable electronic device comprises receiving data from a user indicating desired operational times for the controllable electronic device during the upcoming period of time.

48. The one or more non-transitory computer-readable media of claim 44, wherein the generating the schedule comprises:

generating a candidate schedule for the controllable electronic device that schedules operation of the controllable electronic device during intervals of the upcoming period of time in which the estimated market price is lower than in other intervals of the upcoming period of time;

modeling performance of the controllable electronic device according to the generated schedule; and evaluating the modeled performance of the controllable electronic device to determine whether the modeled performance violates any of the performance values during the estimated operating times.

49. The one or more non-transitory computer-readable media of claim 48, wherein the generating the schedule further comprises revising the candidate schedule based on the evaluation.

50. The one or more non-transitory computer-readable media of claim 44, wherein the upcoming period of time is an upcoming day.

51. The one or more non-transitory computer-readable media of claim 44, wherein the controllable electronic device is a thermostatically controlled electronic device or a non-thermostatically controlled electronic device.

52. The one or more non-transitory computer-readable media of claim 44, wherein the generating the schedule comprises computing a value indicative of the cost of operating the controllable electronic device according to the schedule and a value indicative of a user comfort level obtained when the controllable electronic device is operated according to the schedule.

53. The one or more non-transitory computer-readable media of claim 44, wherein the method further comprises:

determining estimated operating times for a non-controllable electronic device based on data indicating a historical usage of the non-controllable electronic device; and generating a schedule for operating the non-controllable electronic device during the upcoming period of time based at least in part on the estimated operating times for the non-controllable electronic device.

54. One or more non-transitory computer-readable media storing computer-executable instructions for causing a computer to perform a method, the method comprising:

determining estimated market prices of power for an upcoming period of time, the upcoming period of time including different estimated market prices of power at different time intervals within the upcoming period of time, including a peak power price time interval and a lower power price time interval during which the estimated market price of power is less than during the peak power price time interval;

generating a schedule for operating a non-controllable electronic device throughout the upcoming period of time, the schedule including randomly selected time periods of operation that cumulatively correspond to a historical usage of the non-controllable electronic device, the randomly selected time periods occurring at least partially during the peak power price time interval or the lower power price time interval; and calculating a cost of operating the non-controllable electronic device according to the schedule.

55. The one or more non-transitory computer-readable media of claim 54, wherein the method further comprises:

monitoring power usage in a household power network; and computing the data indicating the historical usage of the non-controllable electronic device from the monitored power usage.

56. One or more non-transitory computer-readable media storing computer-executable instructions for causing a computer to perform a method, the method comprising:

via a graphic user interface, allowing a user to input data indicating device-specific operational parameters for each individual household device in a group of two or more household devices;

determining estimated market prices of power for an upcoming time period, the upcoming period of time including different estimated market prices of power at different time intervals within the upcoming period of time, including a peak power price time interval and a lower power price time interval during which the estimated market price of power is less than during the peak power price time interval;

generating respective schedules indicating time intervals during which each of the respective household devices is operational and time intervals during which each of the respective household devices is not operational for the upcoming time period, the household devices being thermostatically controlled household devices and the schedules including time intervals of precooling or preheating for the respective household devices occurring at least partially during the lower power price time interval;

computing a cost for operating the household devices according to the schedules; and computing a comfort level of a user when the household devices are operated according to the schedules.

57. The one or more non-transitory computer-readable media of claim 56, wherein the schedules are first schedules, the method further comprising:

generating second schedules indicating time intervals during which the respective household devices are operational and time intervals during which the respective household devices are not operational, at least one of the time intervals during which the respective household devices are operational in the second schedules being different from the first schedules;

computing a cost for operating the respective household devices according to the second schedules; and computing a comfort level of a user when the respective household devices are operated according to the second schedules.

58. The one or more non-transitory computer-readable media of claim 57, wherein the generating the second schedules comprises:

modeling performance of the respective household devices when the household devices are operated according to the respective first schedules;

evaluating the performance of the respective household devices according to the first schedules relative to desired one or more operating times and one or more desired performance limits of the respective household devices; and modifying the first schedules to address violations in the desired operating times and the desired performance limits of the respective household devices detected as a result of the evaluation.

59. The one or more non-transitory computer-readable media of claim 56, wherein:

the data concerning operational parameters for the respective household devices include one or more time intervals during which the user prefers to have the respective household devices operational; and generating the schedules is based at least in part on the one or more time intervals.

60. The one or more non-transitory computer-readable media of claim 59, wherein the method further comprises receiving data from the user indicative of respective performance limits for each individual household device in the group of two or more household devices, the respective performance limit for one of the household devices indicating a performance limit within which the user prefers to have the household device operate.

\* \* \* \* \*